US007576756B1

(12) United States Patent
Good et al.

(10) Patent No.: US 7,576,756 B1
(45) Date of Patent: *Aug. 18, 2009

(54) SYSTEM AND METHOD FOR INTERACTION OF GRAPHICAL OBJECTS ON A COMPUTER CONTROLLED SYSTEM

(75) Inventors: Lance E. Good, Cupertino, CA (US); Mark J. Stefik, Portola Valley, CA (US); Patrick Baudisch, Seattle, WA (US); Jock D. Mackinlay, Palo Alto, CA (US); Polle T. Zellweger, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/371,017

(22) Filed: Feb. 21, 2003

Related U.S. Application Data

(60) Provisional application No. 60/357,850, filed on Feb. 21, 2002.

(51) Int. Cl.
*G09G 5/00* (2006.01)
*G06F 3/048* (2006.01)
(52) U.S. Cl. ...................... 345/635; 715/792
(58) Field of Classification Search .......... 345/619–641, 345/708, 427, 440–441; 707/5, 6; 715/792, 715/635, 537
See application file for complete search history.

(56) References Cited

U.S. PATENT DOCUMENTS

| | | | | |
|---|---|---|---|---|
| 5,247,651 A * | 9/1993 | Clarisse | ...................... | 703/13 |
| 5,572,639 A * | 11/1996 | Gantt | ......................... | 345/651 |
| 5,844,559 A * | 12/1998 | Guha | ......................... | 715/846 |
| 5,874,959 A * | 2/1999 | Rowe | ......................... | 345/634 |
| 5,883,625 A * | 3/1999 | Crawford et al. | ............ | 715/788 |
| 5,914,718 A * | 6/1999 | Chiu et al. | ................. | 715/863 |
| 6,160,553 A * | 12/2000 | Robertson et al. | ........... | 715/767 |
| 6,211,856 B1 * | 4/2001 | Choi et al. | .................. | 345/666 |
| 6,337,703 B1 * | 1/2002 | Konar et al. | ................ | 715/858 |
| 6,396,497 B1 * | 5/2002 | Reichlen | ...................... | 345/427 |
| 6,449,612 B1 * | 9/2002 | Bradley et al. | ................ | 707/6 |
| 6,583,794 B1 * | 6/2003 | Wattenberg | ................. | 345/708 |
| 6,629,097 B1 * | 9/2003 | Keith | ............................. | 707/5 |
| 2002/0044154 A1 * | 4/2002 | Baar et al. | .................. | 345/660 |
| 2002/0080181 A1 * | 6/2002 | Razdow et al. | ............. | 345/772 |
| 2002/0112180 A1 * | 8/2002 | Land et al. | .................. | 713/200 |
| 2002/0119431 A1 * | 8/2002 | Baird et al. | ................. | 434/236 |
| 2002/0129068 A1 * | 9/2002 | Takasu et al. | ............... | 707/530 |
| 2002/0156806 A1 * | 10/2002 | Cox et al. | ................ | 707/501.1 |

(Continued)

OTHER PUBLICATIONS

"Visio 2000 Standard Edition, User Guide", 1999, Visio Corporation, Seattle WA. All pages.*

(Continued)

*Primary Examiner*—Ryan R Yang
(74) *Attorney, Agent, or Firm*—Oliff & Berridge, PLC

(57) ABSTRACT

A user interface method and system for performing sense-making tasks using visual information objects. The present invention provides techniques for the system to perform operations for creating, rearranging visual information objects, reallocating display space and scaling user input automatically so that users need not interrupt their creative activities. Such operations are intuitive and non-intrusive. Certain of the behavior results of the operations are specified in contracts associated with each visual information object.

11 Claims, 27 Drawing Sheets

U.S. PATENT DOCUMENTS

2002/0199191 A1* 12/2002 Thursfield et al. ............. 725/37
2003/0185357 A1* 10/2003 Kaghazian ............... 379/93.24
2004/0141014 A1* 7/2004 Kamiwada et al. .......... 345/848
2004/0181554 A1* 9/2004 Heckerman et al. ...... 707/104.1
2005/0010583 A1* 1/2005 Clifton-Bligh ............. 707/100

OTHER PUBLICATIONS

"Microsoft Vision History", http://www.mvps.org/visio/History.htm.*

Johnson, Brian and Ben Shneiderman. "Tree Maps: A Space-Filling Approach to Visualization of Hierarchical Information Structures". Visualization, 1991. Visualization '91, Proceedings., IEEE Conference on Oct. 22-25, 1991 pp. 284-291.*

Rao, Ramana and John Lamping. "Visualizing Large Trees Using the Hyperbolic Browser". ACM CHI 96, Apr. 13-18, 1996, Companion to, pp. 388-389.*

Mynau, E, Igarashi, T., Edwards, W., Lamaraca, A. "Flatland: New Dimensions in Office Whiteboards". Proceedings of the CHI 99 Conference on Human Factors and Computing Systems, May 1999, pp. 346-353.*

* cited by examiner

SYSTEM AND METHOD FOR INTERACTION OF GRAPHICAL OBJECTS ON A COMPUTER CONTROLLED SYSTEM

This non-provisional application claims the benefit of U.S. Provisional Application No. 60/357,850, entitled "Zooming Interfaces For Sensemaking, Visualization, and Navigation" which was filed on Feb. 21, 2002, and is hereby incorporated by reference in its entirety.

CROSS REFERENCE TO RELATED APPLICATIONS

Reference is made to the following commonly-assigned U.S. Patent Applications: (1) Ser. No. 10/371,263, entitled "System and Method for Moving Graphical Objects on a Computer Controlled System", by Lance E. Good et al., now U.S. Pat. No. 7,068,288, (2) Ser. No. 10/369,613, entitled "Method and System for Incrementally Changing Text Representation", by Benjamin S. Bederson et al. (3) Ser. No. 10/369,614, entitled "Method and System for Incrementally Changing Text Representation", by Benjamin B. Bederson et al., (4) Ser. No. 10/369,612, entitled "Methods and Systems for Navigating a Workspace", by Lance E. Good et al., (5) Ser. No. 10/369,624, entitled "Methods and Systems for Interactive Classification of Objects," by Lance E. Good et al., and (6) Ser. No. 10/369,617, entitled "Methods and Systems for Indicating Invisible Contents of Workspace", by Lance E. Good et al. all filed herewith and the disclosure(s) of which are incorporated herein.

FIELD OF THE INVENTION

The present invention is related to the field of computer controlled display systems, in particular techniques which optimize use of available display space and minimize user disruption when performing tasks causing the interaction of graphical objects on the computer controlled display system.

BACKGROUND OF THE INVENTION

Blackboards, electronic whiteboards and other two-dimensional free form workspaces have long been used for supporting brainstorming, sensemaking, and other generative tasks where information is created and organized incrementally. Sensemaking is a term used to describe activities that interweave retrieving, creating and using information. As the amount of information placed in these workspaces grows, the competition for display space increases. If users need to interrupt their ideation to rearrange the information in the workspace, make space for new information, or perform other "housekeeping" functions to enable use of the workspace, they risk disruption of their train of thought or "losing the flow" resulting in the possible loss of ideas. Often, the information contained in the workspace is represented as graphical objects. Thus, there is a general need in systems providing a two-dimensional (2D) workspace for techniques that provide intuitive and timely manipulation and interaction of graphical objects.

The use of computer controlled two-dimensional workspaces for organizing information is well known in the art. Some of these systems include the Alternate Reality Kit (SMITH, R. Experiences with the Alternate Reality Kit: an example of the tension between literalism and magic. *Proceedings of CHI/GI '87*, April 1987, pp. 61-67), Aquanet (MARSHALL, C. AND ROGERS, R. Two Years Before the Mist: Experiences with Aquanet, *Proceedings of the ACM Conference on Hypertext*, November 1992, pp. 53-62), Cognoter (STEFIK, M., BOBROW, D., FOSTER, G., LANNING, S. AND TATAR, D. WYSIWIS Revised: Early Experiences with Multi-User Interfaces. *Proceedings of the Conference on Computer-Supported Cooperative Work*, December 1986, pp. 276-290), Flatland (MYNATT, E., IGARASHI, T., EDWARDS, W., LAMARCA, A. Flatland: New Dimensions in Office Whiteboards. *Proceedings of the CHI 99 Conference on Human Factors and Computing Systems*, May 1999, pp. 346-353), MUSE (FURNAS, G. AND ZHANG, X. MuSE: A Multiscale Editor, *Proceedings of UIST '98*, November 1998, pp. 107-116), PowerPoint (MICROSOFT POWERPOINT. http://www.microsoft.com/office/powerpoint/), Storyspace (EASTGATE SYSTEMS STORYSPACE. http://www.eastqate.com/Storyspace.html), Tivoli (PEDERSON, E., MCCALL, K., MORAN, T. AND HALASZ, F. Tivoli: An Electronic Whiteboard for Informal Workgroup Meetings, *Proceedings of the Conference on Human Factors in Computing Systems*, April 1993, pp. 391-398), VIKI (MARSHALL, C., SHIPMAN, F., AND COOMBS, J. VIKI: Spatial Hypertext Supporting Emergent Structure, *Proceedings of the 1994 ACM European Conference on Hypermedia Technology*, September 1994, pp. 13-23), and Web Squirrel (EASTGATE SYSTEMS WEB SQUIRREL http://www.eastgate.com/squirrel/Welcome.html).

In order to minimize "losing the flow" when using such systems, the manner in which a user interacts and the system responds is critical. A number of techniques have been disclosed in the art which purportedly facilitate the use of such systems. Some techniques provide for certain operations to be automatically performed. One such operation is the handling of related information in some coordinated fashion, e.g. as a list or group. For example, PowerPoint, Tivoli, and VIKI all have notions of a list structure to automate the alignment and ordering of list items. Although PowerPoint and Tivoli also use this list structure to assist in inserting items into the list, neither of these systems provide an interactive preview of the resulting insertion. Such a preview is useful in understanding the effect of updating a list structure. Storyspace and VIKI also have the notion of a subspace (i.e. a separate and distinct interaction space within another space) to automate the maintenance of a spatial, hierarchical collection of objects.

Several systems have also employed features for automating object interactions. The Flatland system uses a bumping concept to avoid the occlusion of objects on a whiteboard surface. Moving or growing an object could cause it to transitively bump other objects and if an object hits the edge of the whiteboard (i.e. the visible display area) it would automatically shrink. Data Mountain (ROBERTSON, G., CZERWINSKI, M., LARSON, K., ROBBINS, D., THIEL, D., VAN DANTZICH, M. Data Mountain, Using Spatial Memory for Document Management, *Proceedings of UIST '98*, November 1998, pp. 153-162) also employs bumping to reduce the occlusion of web pages on an inclined plane; facile movement and placement of the pages is permitted while keeping at least some part of the page visible. The Alternate Reality Kit provided a more diverse collection of object interaction contracts, such as gravity or spring forces, to simulate object interactions in a virtual world with alternate physics principles. Lastly, PowerPoint provides automatic panning, a type of object interaction to keep the current text entry point in view. However, PowerPoint does not return your position to the original viewpoint when the text entry is completed.

Another technique known in the art is to provide specialized tools to enable movement or the organization of objects. The alignment stick (RAISAMO, R. AND RAIHA, K. A New Direct Manipulation Technique for Aligning Objects in Drawing Programs. *Proceedings of UIST '96*, November 1996, pp. 157-164 and RAISAMO, R. An alternative way of drawing.

CHI'99 Proceedings, 1999, 175-182) provides a tool for providing direct manipulation of layouts. The broom alignment tool (ROBBINS, J., KANTOR, M. AND REDMILES, D. Sweeping away disorder with the broom alignment tool. Conference Companion of CHI'99) is similar to the alignment stick, but it can also distribute objects along its length. The user can cycle through different distribution policies by pressing the space bar. Furthermore, moving the broom backward automatically undoes the alignment operation.

SUMMARY OF THE INVENTION

A computer controlled system embodying a method for graphical object interaction is disclosed. The system provides intuitive and non-intrusive techniques to perform operations for rearranging graphical objects, reallocating display space and scaling user input automatically so that users need not interrupt their creative activities. The user interface techniques may be applied to any application which includes interaction between graphical visual information objects. An important principle is that graphical objects should not unnecessarily occlude or overlap other graphical objects when they are created or manipulated so that they interact with other graphical objects.

The system of the present invention is comprised of: one or more input elements for enabling creation and interaction of said visual information objects; a display for showing a viewed space that is contained within a populated space, each of said visual information objects positioned within said populated space; a processing element for generating display information for said display so that visual information objects within said viewed space maintain user perceptible information throughout the creation and interaction of visual information objects.

DETAILED DESCRIPTION OF THE INVENTION

A system and method for graphical object interaction that enables a user to effectively and efficiently organize and process large amounts of data is described herein. When utilizing the system a user is able to reduce disruptions to their activity caused by the limited display space constraints of a computer controlled display system. So for example, when a user is entering or organizing information on a workspace area of the system, they need not be distracted by the need to rearrange items in order to enter new information. This allows the user to stay "in the flow" of providing such new information.

The system and method of the currently preferred embodiment are implemented in a sensemaking system as described below. In such a sensemaking environment, instances of information content are referred to herein as "visual information objects". Visual information objects are in turn handled by the system as graphical objects. It should also be noted and emphasized that certain of the techniques described herein may be applied generally to the field of user interfaces for computer controlled display systems and may be utilized for other types of applications that utilize graphical objects other than the sensemaking activities described herein.

Description of a Sensemaking Activity

Figure 1:
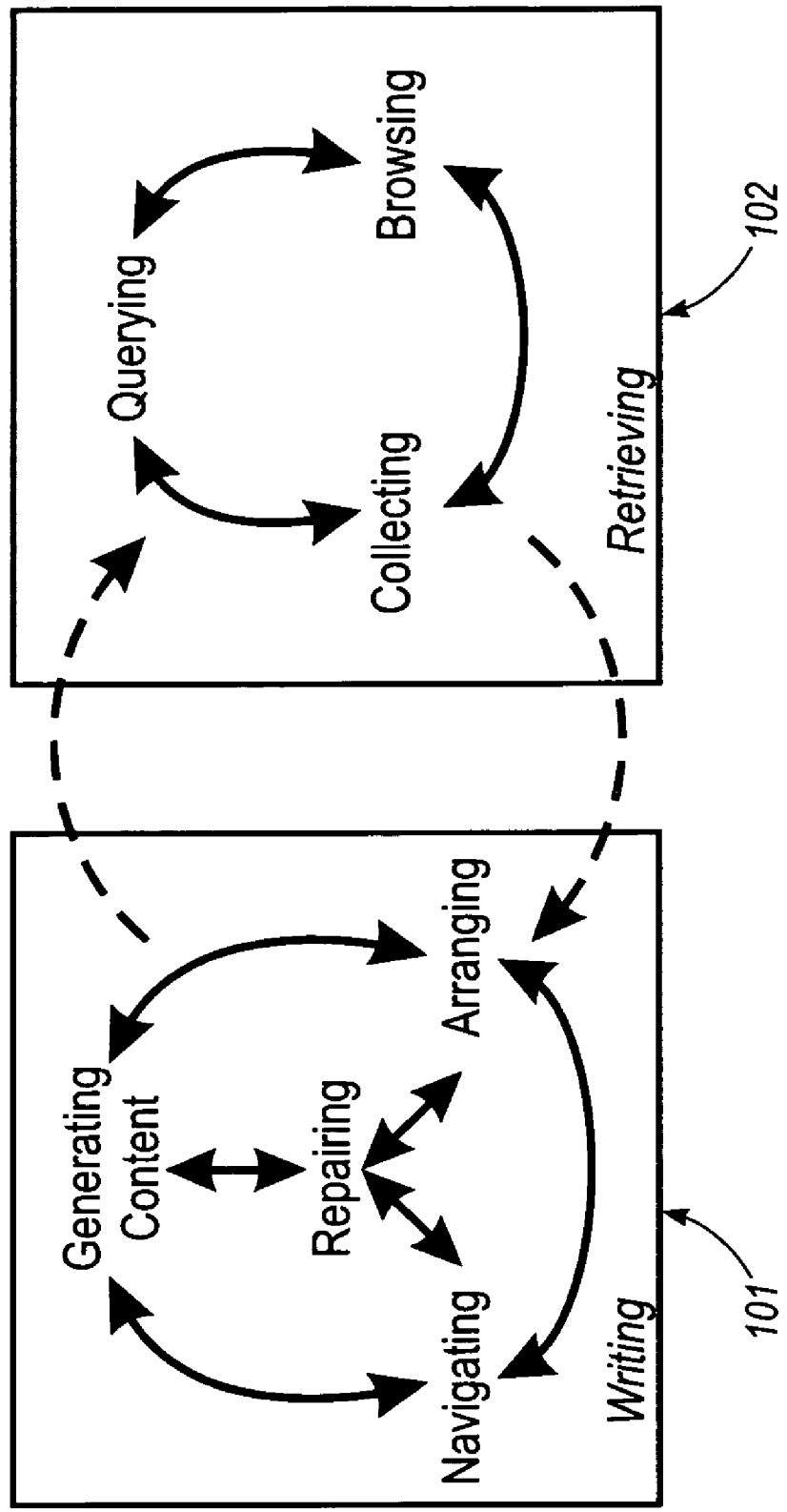
FIG. 1 is a transition graph that is used to described the sensemaking activity.

FIG. 1 portrays a transition graph that is used to describe sensemaking as an activity. The box 101 represents a writing workspace in which a user writes information down (generates content), arranges the writings/content, and navigates through the generated content. The box 102 represents a retrieving workspace in which the user issues queries, browses, and collects information. During the course of the sensemaking activity, the user can shift attention from one workspace to the other. For example, the user could search and browse for information in the retrieving workspace until finding something to add and arrange in the writing workspace. Alternatively, a user could pause from writing in order to search for relevant information in the retrieving workspace. In an implementation, the writing and retrieval workspaces need not be concurrently displayed nor do they need to be separate and distinct workspaces. The retrieval workspace has at least an element for defining and submitting queries and an area for display of some representation of the result of a query.

It has been determined that users transition around such a graph and between the two workspaces in the course of developing their ideas. When the transition steps are too cumbersome, or when resource conflicts in external cognition interfere with progress, the steps take longer or must be repeated. This may cause the user to "lose the flow" or become disrupted from their sensemaking activity.

It has been determined that user interface techniques for working with such workspaces can help a user stay in the flow. For example, when generating content, a key requirement for staying in the flow is to maintain a visible region of work—that is, to keep the item(s) that the user is working on, together with as much context as possible, visible to the user. The system may adjust the view or move objects to accomplish this. A policy favoring limited occlusion or non-occlusion helps prevent items from getting lost during system manipulations.

The following are assumptions about key cognitive resources for a sensemaking activity on a workspace. A cognitive resource is one that aids in the performance of some mental task.

Display space. The system's display space is a primary resource for external cognition. Information requires display space and display space is limited. In general, a display space is too small to show all of the information at once. Many of the design elements in the currently preferred embodiment involving zooming, panning, and peripheral awareness indicators are intended to make trade-offs in the allocation of display space. In making these trade-offs the user and system determine what information elements to display and how much display space to allocate to each element in order to support the active sensemaking task. The management of a display space influences the cost structure of all three activity steps in the writing workspace: generating, arranging, and navigating.

Persistence of spatial arrangement. A user uses a system's interactive blackboard-like writing workspace to create and arrange items. The meaning of the information is held both in the content (that is, words or graphical objects such as diagrams, graphs, etc.) as well as in the spatial arrangement. A user tends to locate closely related items near each other so that they can be conveniently used together. Parallel arrangements of items suggest parallel meanings. Persistence of arrangement speeds access in that the user roughly remembers the location of items and does not need to search for them. It also speeds understanding when a user uses parallel visual structures to imply parallel meanings. The user invests time to arrange items, and presumably benefits both from convenient use and speedier access because he remembers where things are. If the system automatically changes the arrangement radically or in some non-intuitive or illogical fashion, the user will invest more time and energy to learn the new arrangement and possibly to rearrange it.

Limited focus. A user cannot think about everything at once. The system provides several kinds of "focus+context" mechanisms to support a user in focusing on what is important. These mechanisms include grouping operators for objects, peripheral awareness indicators on spaces, and automatic reduction of the scale of the contents of hierarchical spaces so that users can focus on the "big picture" or overall categories while maintaining limited awareness about internal details. The management of this resource especially influences the navigation step in the workspace.

Figure 2:
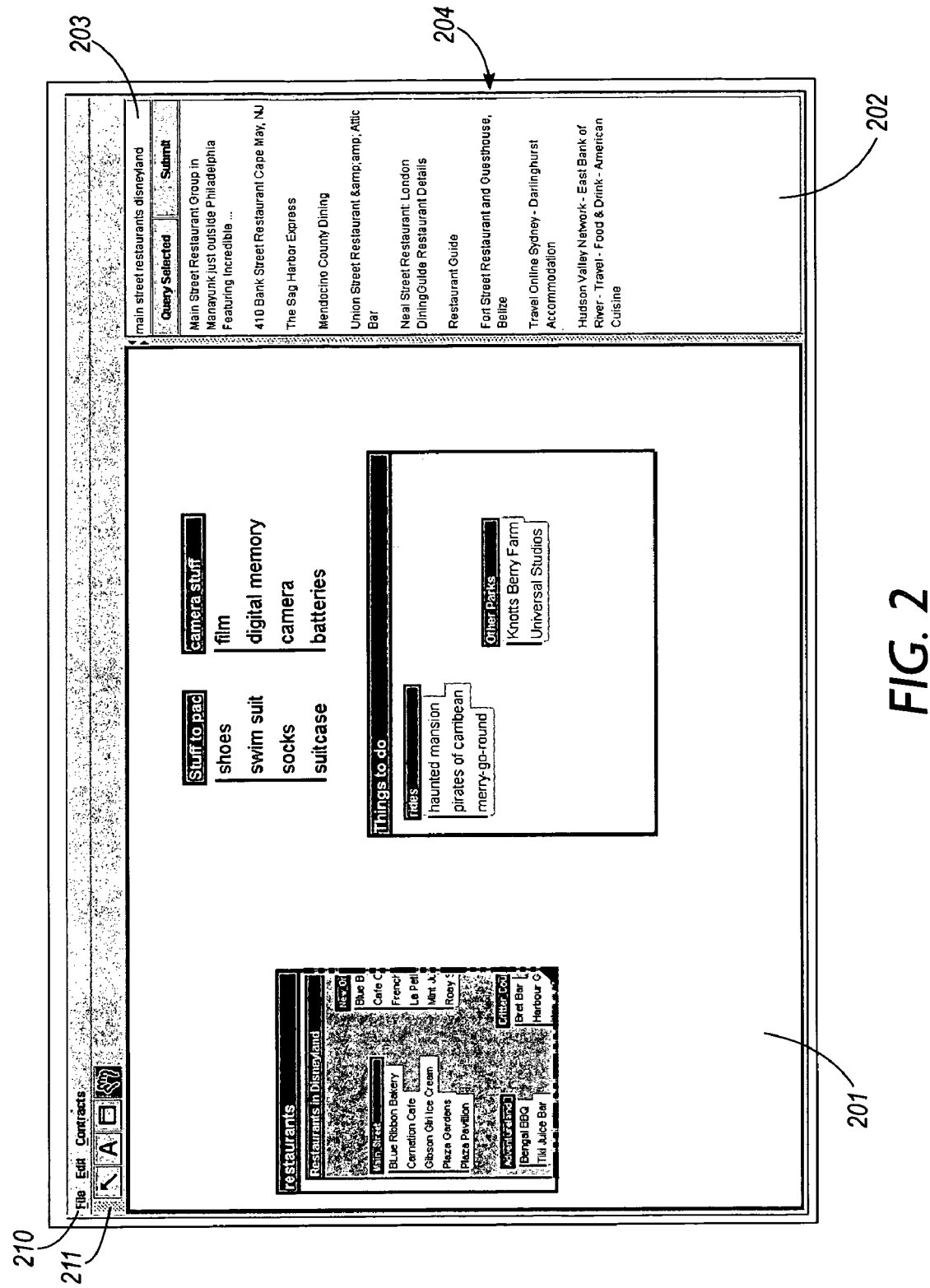
FIG. 2 illustrates a sensemaking application and associated workspaces for performing sensemaking tasks on a computer controlled display system of the currently preferred embodiment.

FIG. 2 illustrates a sensemaking application and accompanying workspaces. Referring to FIG. 2, a writing area 201 provides an area where a user performing the writing tasks as described with reference to box 101 of FIG. 1. A retrieval area 202 provides an area where a user is performing the retrieval tasks as described with reference to box 102 of FIG. 1. The writing area 201 is used to display the various visual information objects as will be described in more detail below. Also, it should be noted that the writing area 201 may itself be an instance of a space. The retrieval area 202 provides an input area 203 for entering query terms as well as results area 204 for receiving the results from the query. Note that in the currently preferred embodiment the query could be to a search engine that is designed to access information available on a local computer, the Internet, an internal network, or any combination thereof.

Further illustrated is a menu bar 210 which provides a plurality of function menus that may be selected in a point and click or pull down fashion, as well as a toolbar 211 for directly invoking commonly used functions. The manner of user operation of the menu bar 210 and corresponding function menus and toolbar 211 is according to well known user interface techniques, thus further description of their operation is not deemed necessary. The various functions provided in menu bar 210 include those for creating or manipulating visual information objects, viewing or modifying contracts and entering a repair cycle. Toolbar 211 includes functions for entering text, creating space objects and moving objects.

System Operation Overview

During the course of a sensemaking activity, the user will alternate between steps of generating content, arranging the visual information objects, and navigating between different parts of the workspace. The system manages key resources for external cognition with contracts on its visual information objects to minimize "housekeeping functions" and to help keep a user in the flow.

The first step is the generation of content. In the system, for example, content corresponds to the words contained in text boxes or various organizational structures. These could also be graphical information objects, such as images, charts, etc. The contracts in the system's visual information objects are intended to support a user in staying in the flow while generating content. The system does not require that a user "make space" before entering information or otherwise generating content. A user can start at any point in the workspace and start typing or otherwise entering objects. As a text box or a list grows, the system bumps other objects or pans the containing space as needed so that the user can maintain focus and stay in the flow of generating content. Similarly, as a user is adding elements to a list, the contracts make space for the new items in the list and enforce vertical alignment. The user does not need to stop entering to arrange the items.

The system also simplifies the controls for arranging objects. Contracts are active during content generation and automatically arrange objects without additional user action using bumping, transitive bumping, and panning. The system also simplifies the "move" operation by providing visual feedback of the process. The simple pick-up-and-move operation has visual feedback with drop shadows that provide cues showing which objects are being moved. As the user moves an object or set of objects over a space, the moving objects are scaled while in motion to the appropriate scale for the space so that the user can see how objects will fit in. When a user moves objects to put them into a list, the list opens up and makes room for them. In one smooth action, the user can move an object and decide just where to drop it in the list. The list dynamically moves its elements around to prepare room for it. When the user releases the mouse button, all of the objects are dropped into the selection point in the list and scaled to have the appropriate font size for the list. If a user drops an object in a space in a way that would occlude some other objects, an action suggestive of stepping on a bar of soap moves objects out of the way. In addition, if a user wants to create some space in the middle of arranging objects, the user can dynamically turn the movement of an object into a "snowplow" mode. The drop shadow indicating selection disappears and the user can push other objects out of the way. This action does not require the user to fetch a tool or to drop the object first and then select the objects to be moved. The user uses the object to push other objects to make room. These automatic actions keep the user in the flow during arrangement, without requiring the distraction of selecting, moving, or resizing other objects.

The system also provides simplified navigation. Navigation or panning, is the work by a user to get an appropriate view of some part of the workspace. One way that the system supports navigation is by the automatic reduced scaling of the contents of nested workspaces. This gives the usual benefits of a hierarchical view where it is easier to see either the higher level structure or to drill down to see details. The system provides a simple one-click interface to dive down to a subspace so that it grows to fill the display space or to return back to the containing space. The system also provides "City Lights" peripheral awareness indicators to help keep a user oriented to the presence of objects that are clipped and not currently in view.

The system has been implemented for operation on computer based systems having a graphical user interface such as those utilizing the Windows® Operating System from Microsoft, Inc. or the Mac OS operating System from Apple Computer, Inc. Such graphical user interfaces have the characteristic that a user may interact with the computer system using a cursor control device and/or via a touch-screen display, rather than solely via keyboard input device. Such systems also have the characteristic that they may have multiple "windows" wherein discrete operating functions or applications may occur. Further, such computer based system will be preferably of a "free form" type wherein a user may create and manipulate objects independent of positional constraints. Examples of such free form systems include electronic whiteboards or paint and/or draw application programs. A more complete description of such a computer-based system upon which the present invention may be implemented is described below with reference to FIG. 45.

Visual Information Objects

To support sensemaking activities, three basic types of visual information objects are commonly used—text objects, lists, and spaces. A fourth type, graphical objects such as images, diagrams, drawings and the like, may also be used. However, the currently preferred embodiment will be described with respect to the first three types, but it would be apparent to one of skill in the art to use all or any subset of the four types. The behavior of these objects under different kinds of interactions such as creation, movement or growing, is governed by policies, represented as contracts. Each type of visual information object has its own kind of contract. Further, each instance of a visual information object may have its own instance of a contract that is different from contracts of other visual information objects of the same type.

Text objects are visual information objects that contain textual information. Instantiations of text objects are referred to as a "text box(es)". List objects are visual information objects that arrange and present items in some ordered sequence, e.g. in a vertical tabular format. Instantiations of list objects are referred to as a "list(s)". A space object is a visual information object that is used to arrange other visual information objects. Instantiations of space objects are referred to as a "space(s)".

Contracts in the currently preferred embodiment of the present invention govern both objects themselves and the "children" or elements of composite objects. For example, contracts for a list object govern both the behavior of the visual list object and also the behavior of objects that are members of the list. Note that if an element is "removed" as an element of a composite object it is no longer governed by the parent object. Such relationships can be established explicitly (e.g. in a list), or implicitly (e.g. subspace within a space).

Listed below are examples of properties of visual information objects governed by contracts.

Alignment. It is desirable to have constraints that govern the vertical or horizontal alignment of objects with other objects. For example, the left boundaries of the elements of a list should be vertically aligned.

Occlusion. It has been determined that for sensemaking activities, contracts often preclude occlusion. This prevents temporary "loss" of information when one objects obscures another. However, it is recognized that there may be instances where some occlusion may be desirable, e.g. "piles" or "stacks" of related visual information objects.

Clipping. Because display space is limited, clipping is inevitable. Clipping refers to objects that cannot be completely displayed, typically as a result of performing some operation. Contracts about clipping determine what information is portrayed about clipped objects.

Growth. The size of an object can change if the amount of information that it holds changes or if the user stretches the object in the display space. Objects differ in their growth contracts.

Scale. Objects can be shown at different scales. There is a default scale for objects. The scale of an object can be changed by explicit user actions. Scale contracts can also be transformed when an object is moved into a region where additional scaling contracts apply. Scale contracts can also apply differently to different parts of an object.

Aspect Ratio. The ratio of height to width of an object is preserved by most operations.

Type. Most operations preserve the type of an object.

Representation of Detail. Contracts governing level of detail can control the use of overviews and summaries.

The visual information objects of the present invention are implemented using well known software development techniques and data structures and are described in more detail below.

The No-Occlusion Principle

When the populated space contains more information than can be displayed in the view space using a reasonable scale, something has to give. Other systems have addressed this by using 2.5D or 3D techniques such as having windows that partially overlap or cover up other windows. Using such systems, users can cause occlusion unintentionally, such as when a new object is created on top of an existing one. In such cases, the user is focused on manipulating some objects and may not notice that another object has been occluded. As a result, objects that the user needs for the next steps of sense-making may become difficult to access or may have disappeared for no obvious reason. Detecting occlusions requires the user's attention and resolving them may require breaking their flow of concentration.

Many of the contracts described below enforce a no-occlusion principle. In practice, this often means that instead of objects covering up other objects, they "bump" them aside. Bumping behavior arises when objects are moved, when objects grow to contain more information, and when they are re-sized by the user.

Text Box Objects

Figure 3:
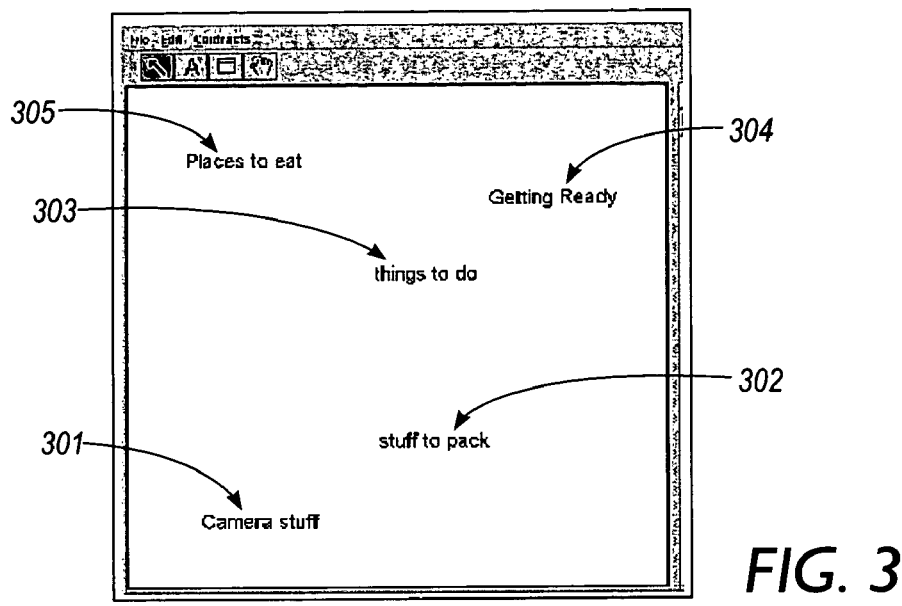
FIG. 3 illustrates text box visual information objects as may be implemented in the currently preferred embodiment.

Text box objects are visual information objects for containing text. An easy way to start developing and capturing ideas is to create text boxes anywhere in an open space for the ideas that come to mind, as shown in FIG. 3. Referring to FIG. 3, text boxes 301-305 are displayed.

Figure 4:
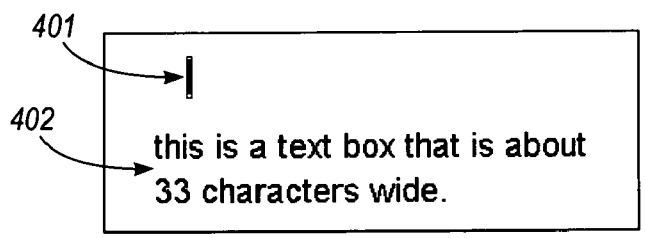
FIG. 4 illustrates how text is created in a text box in the currently preferred embodiment.

FIG. 4 illustrates how text is created. FIG. 4 shows two text boxes 401 and 402. The text box 401 is illustrated prior to entry of text and is displayed as a vertical line. This vertical line appears as the left hand edge of a text box when a user clicks in the space and before entering any text. In the currently preferred embodiment, creation of a text box is enabled when a user positions the cursor in an open area of a space and clicks the mouse button.

Figure 5:
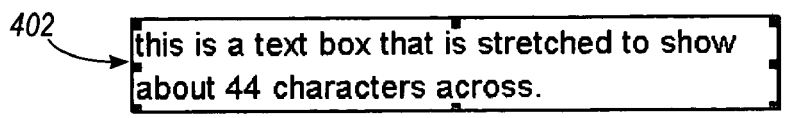
FIG. 5 illustrates stretching of a text box to change the aspect ratio as may be performed in the currently preferred embodiment.

What happens to a text box when a user types depends on which contract is in force. In a usual case for the currently preferred embodiment, the user just begins typing. In this case, the vertical line disappears and a cursor appears at the point where text is entered as the user enters text. As suggested by the text box 402, a user can type and the text box will grow to the right as the user adds characters, and shrink to the left if the user backspaces. In the currently preferred embodiment, the box can grow to the right until reaching a maximum number of default characters, e.g. 33. If the user continues typing, line wrap will occur and a second line of text will appear left aligned and below the first line. Referring briefly to FIG. 5, the text box 402 can later be stretched to change the aspect ratio. This operation does not change the text size (font size), but does cause the line wrap to be recomputed. The stretching of a text box is accomplished by "selection" of the text box, typically by a point and click operation using the cursor control device, and then selecting and dragging an anchor point, e.g. point 501, to a desired width. Alternative methods of stretching, e.g. after selection clicking the mouse button to cause stretching to the right by predetermined character increments, would not depart from the spirit and scope of the present invention.

Figure 6:
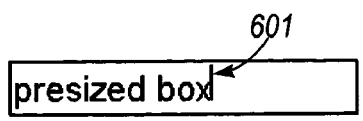
FIG. 6 illustrates stretching of a text box to create a pre-sized region for the text as may be performed in the currently preferred embodiment.

In another stretching variant interaction shown in FIG. 6, a user can immediately stretch vertical bar 601 to the right, creating a pre-sized region for the text. In this example, the contract lets the text grow to the right to fill the region. When the characters reach the right hand side, the text box grows downwards and system will wrap lines (i.e. begin entering text on a new line).

None of the operations relating to the "length" of the text box affect the visual size (roughly "font size") of the text itself. In the currently preferred embodiment a text box scaling operation that uses predetermined keys on the keyboard, e.g. the Page Up and Page Down keys, can be used to grow or shrink the scale of the text box and the text within it. The scaling contract preserves the aspect ratio and line wrapping within a text box.

Lists

Figure 7:
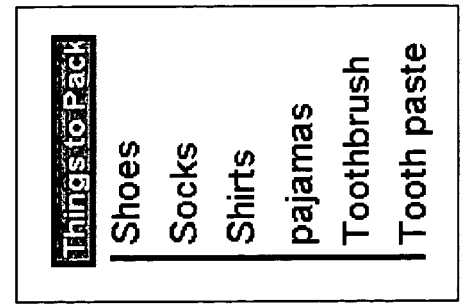
FIG. 7 illustrates an example of a list visual information object as may be implemented in the currently preferred embodiment.

A list is a visual information object in the system that arranges items in an ordered sequence. In the currently preferred embodiment, this arrangement is vertically oriented. A list has a title (written in a title bar) and zero (0) or more members. FIG. 7 shows an example of a list titled "Things to Pack."

Lists can be created by selecting a set of items, e.g. text boxes, and invoking an operation to cause them to be treated as a list. In the currently preferred embodiment of the present invention, this is accomplished by using a "listify" menu operation on a set of selected items.

Figure 8:
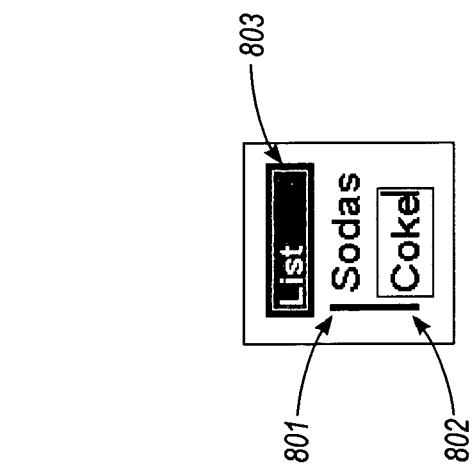
FIG. 8 illustrates a step in making a list from a text box as may be performed in the currently preferred embodiment.

In the currently preferred embodiment, an alternative way to make a list is to start typing an item in a text box, and then ending with a carriage return (typically the enter key of a keyboard coupled to a computer controlled display system). FIG. 8 shows a step in the making of a list from a text box. The user has typed the word "Sodas" 801 followed by depressing the Enter key followed by entering the term "Coke" 802. The system created a list whose title is "List" 803 with the two members "Sodas" 801 and "Coke" 802.

The title "List" is the default for a list structure that is provided upon initial creation of the list structure. The title of the list can then be set by a separate operation—either dragging one of the list elements into the title position to make it the title or positioning the cursor and entering text directly in the title position.

The basic contract for lists causes all members to be left aligned. Items in a list have a default size (font size) and new items that are added to the list are given the same size. As new items are added to a list, the list grows downwards.

Figure 9:
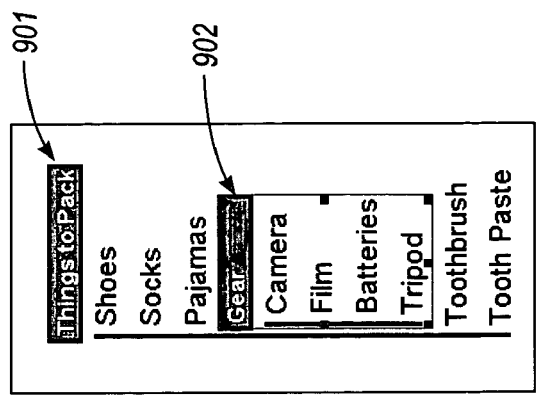
FIG. 9 illustrates a list visual information object containing a sub-list as may occur in the currently preferred embodiment.

Lists are recursive in that they can have other lists as members. This is illustrated in FIG. 9. FIG. 9 shows a list 901 where one of the members of the list, i.e. list 902, is itself a list. The outer list 901 is titled "Things to Pack" and the inner list 902 is titled "Gear." It should be noted that any visual information object can be an item in a list, so Spaces can be members of lists as well.

Figure 10:
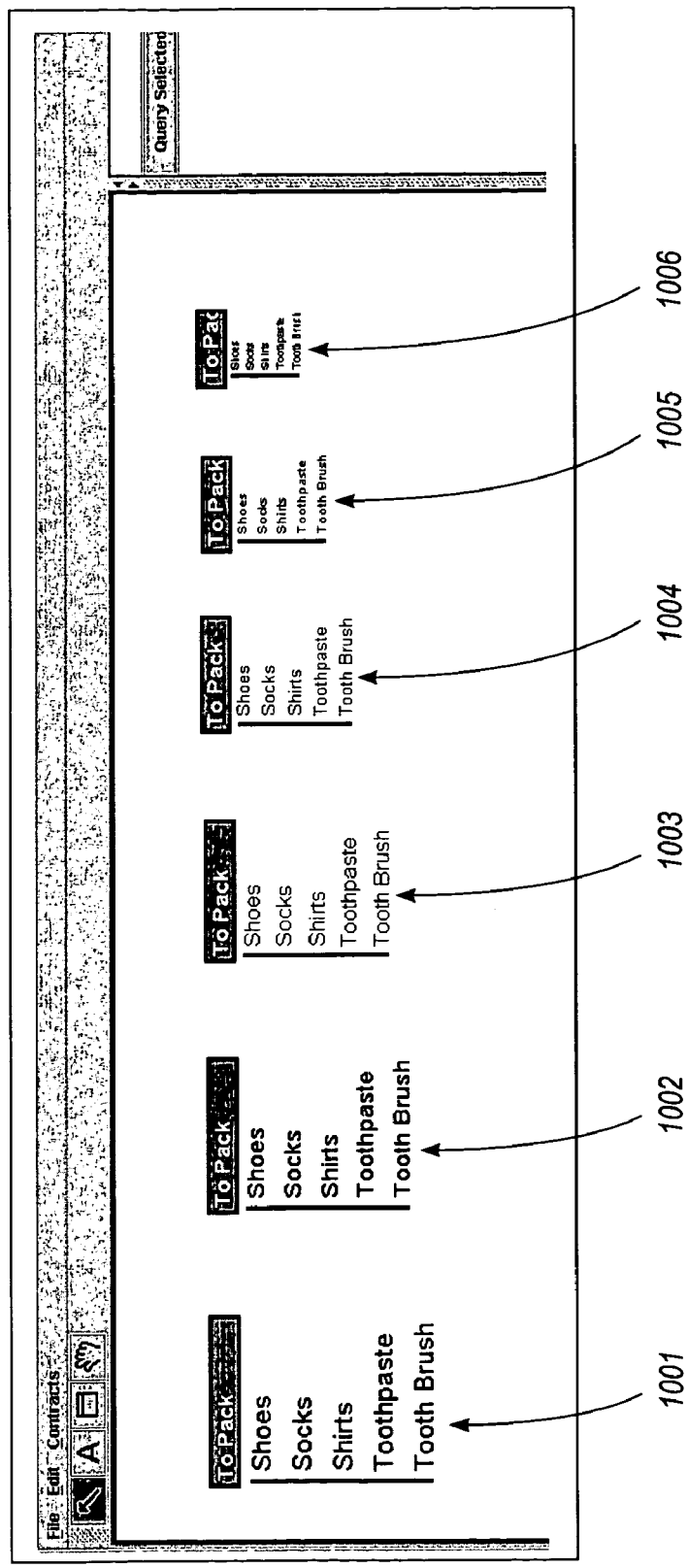
FIG. 10 illustrates scaling the size of text contained in a list as may be performed in the currently preferred embodiment.

Like text boxes, lists have contracts that govern scaling. In the currently preferred embodiment, lists can be scaled by first selecting them and then using the Page Up and Page Down keys. When the scale of a list is reduced, the system preferentially reduces the size of the list members more than the size of the title, as shown in FIG. 10. FIG. 10 illustrates lists 1001-1006 wherein the lists are successively reduced in scale. In this way, when a list is made very small, the user can still read what the list represents and get a rough sense of its size although the elements in the list may be too small to read.

Spaces

The top-level writing workspace of the system of the currently preferred embodiment is itself an instance of a space. A space is conceptually similar to a blackboard for creating and arranging visual information objects, such as text boxes, lists, and other spaces.

Figure 11:
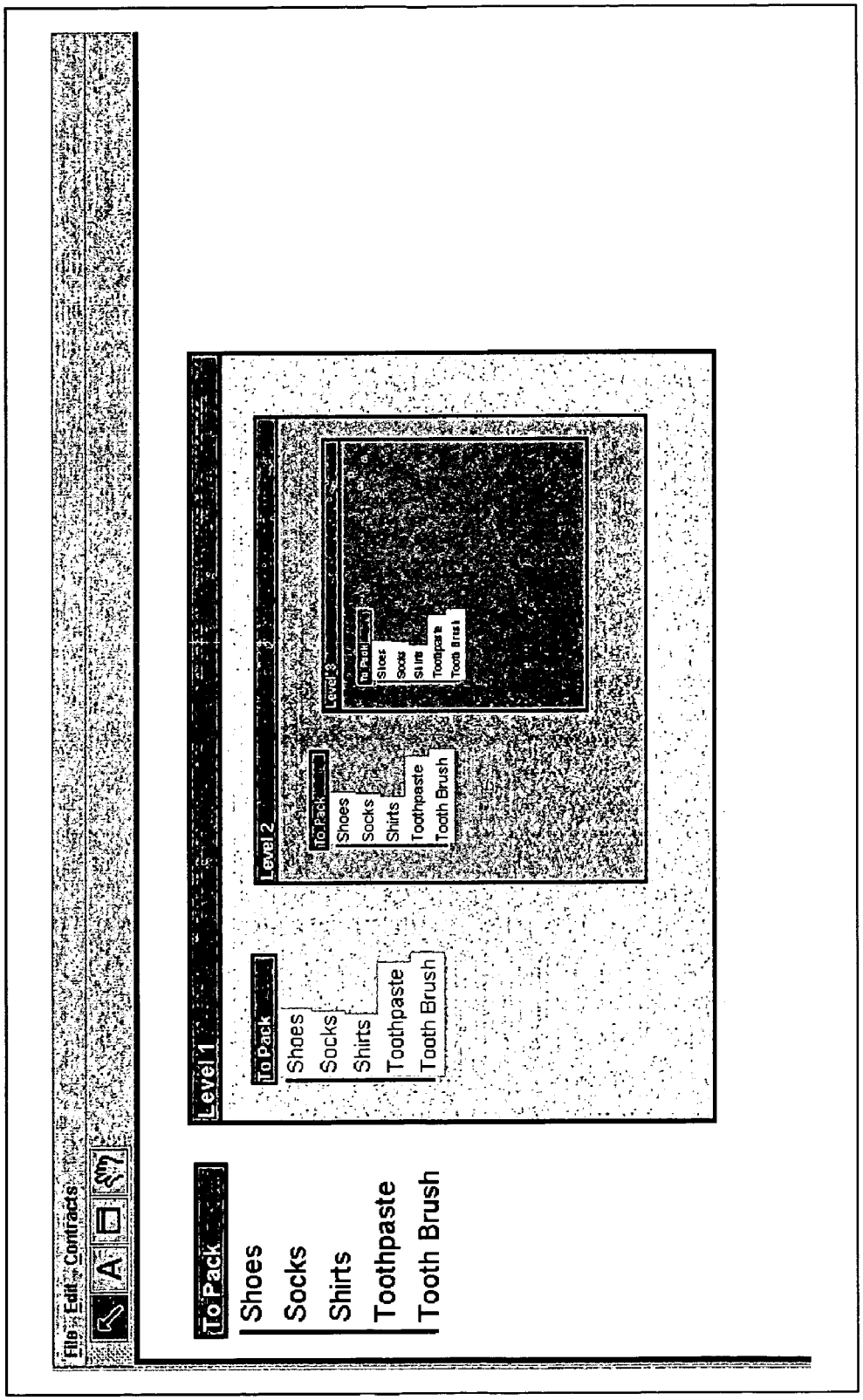
FIG. 11 illustrates the nesting of spaces and resulting reduction in scale of subspaces as may occur in the currently preferred embodiment.

One feature of spaces in the system is that nested spaces reduce the scale of their members. This is illustrated in FIG. 11. This reduction in scale reflects the sense that each level of nesting corresponds to a deeper level of detail. Details are made smaller so as to provide more space for the "higher" or bigger ideas. Nested spaces also darken the background of their open space as another visual cue to the depth of the containment relationship. FIG. 11 shows how a list and some text boxes are scaled and the backgrounds of spaces are shaded differently in nested spaces.

It should be noted that spaces and lists are both composite objects. Their behaviors are different in several important ways and it is instructive to compare some of the differences in their contracts. Like lists, spaces have members. Unlike lists, spaces do not enforce a vertical alignment property for arranging the members. Further, spaces do not grow in size when more members (i.e. information) are added to them.

One way to understand a space is to think of it as a finite window over an infinite canvas. Because the window has a finite size, any visual information objects on the canvas that are not directly under the window are clipped. That part of the canvas on which there are visual information objects is referred to as "populated space" and that part which can be seen at any given time is referred to as "viewed space." Many of the contract elements for spaces are intended to govern trade-offs in managing what information about populated space appears in the viewed space.

Figure 12:
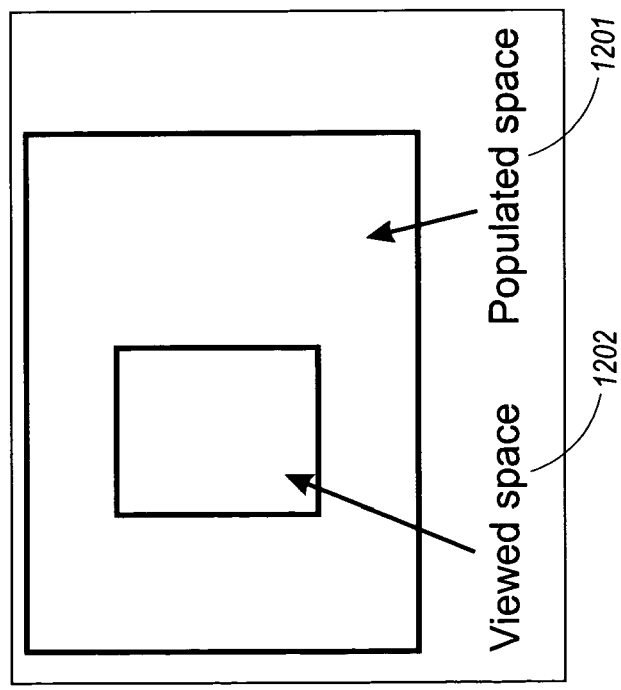
FIG. 12 illustrates the relationship between a "viewed space" and a "populated space" for an instance of a space visual information object as may be utilized in the currently preferred embodiment.

FIG. 12 illustrates the relationship of the viewed space to populated space for a space object. Visual information objects that are in populated space 1201 but not the viewed space 1202 are clipped (i.e. they are not displayed). A panning operation makes it possible to move the viewed space around in the populated space 1201 analogous to moving the "window" over the "canvas" as described earlier.

To provide peripheral awareness of clipped objects in the populated space, a peripheral awareness indicator that is referred to as "City Lights" is provided. City Lights are described more generally in co-pending application entitled "Methods and Systems for Indicating Invisible Contents of Workspace", Ser. No. 10/369,617. As the name suggests, a peripheral awareness indicator operates such that a person can see the "glow" of the lights of a distant city in the night sky before they can see the city itself. A peripheral awareness indicator provides information about clipped objects. Such information about a clipped object could include its direction from the boundary of the viewed space, its size, its distance, its type, its recency or time since last edit, or a summary of its information content.

Figure 13:
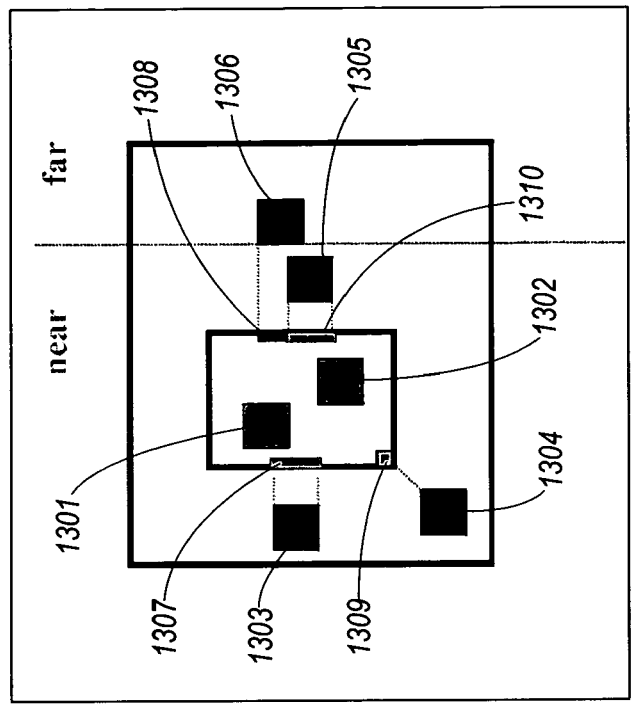
FIG. 13 is an illustration of peripheral awareness indicators for clipped visual information objects contained in a space object as may be utilized in the currently preferred embodiment.

The peripheral awareness indicator of the currently preferred embodiment provides limited information about the size, direction, and distance of clipped objects as illustrated by FIG. 13. In FIG. 13, the boxes 1301-1302 represent items (visual information objects) that are inside the viewed space, and the boxes 1303-1306 indicate clipped items in populated space. The city lights are shown as visually distinct markings on the outer bounding box of the viewed space, see markings 1307-1310. An orthogonal projection from the clipped items onto the bounding box of populated space delineates the edges of the city lights. City lights for objects that are in the "corner" and have no orthogonal projection onto the sides of the viewed space are shown as small corner indicators (see marking 1309). City lights for clipped objects that are nearer than a near boundary (i.e. "near objects") have a first visually distinct characteristic, e.g. a first color. City lights for clipped objects that are farther away (i.e. "far objects") have a second different visually distinct characteristic, e.g. a second color different from the first color. Indicators for near objects are permitted to occlude indicators for far objects because some indicator of an object in the direction of the far object remains. In the currently preferred embodiment, the position of the near/far boundary defaults to half of the width of the viewed space.

Figure 14:
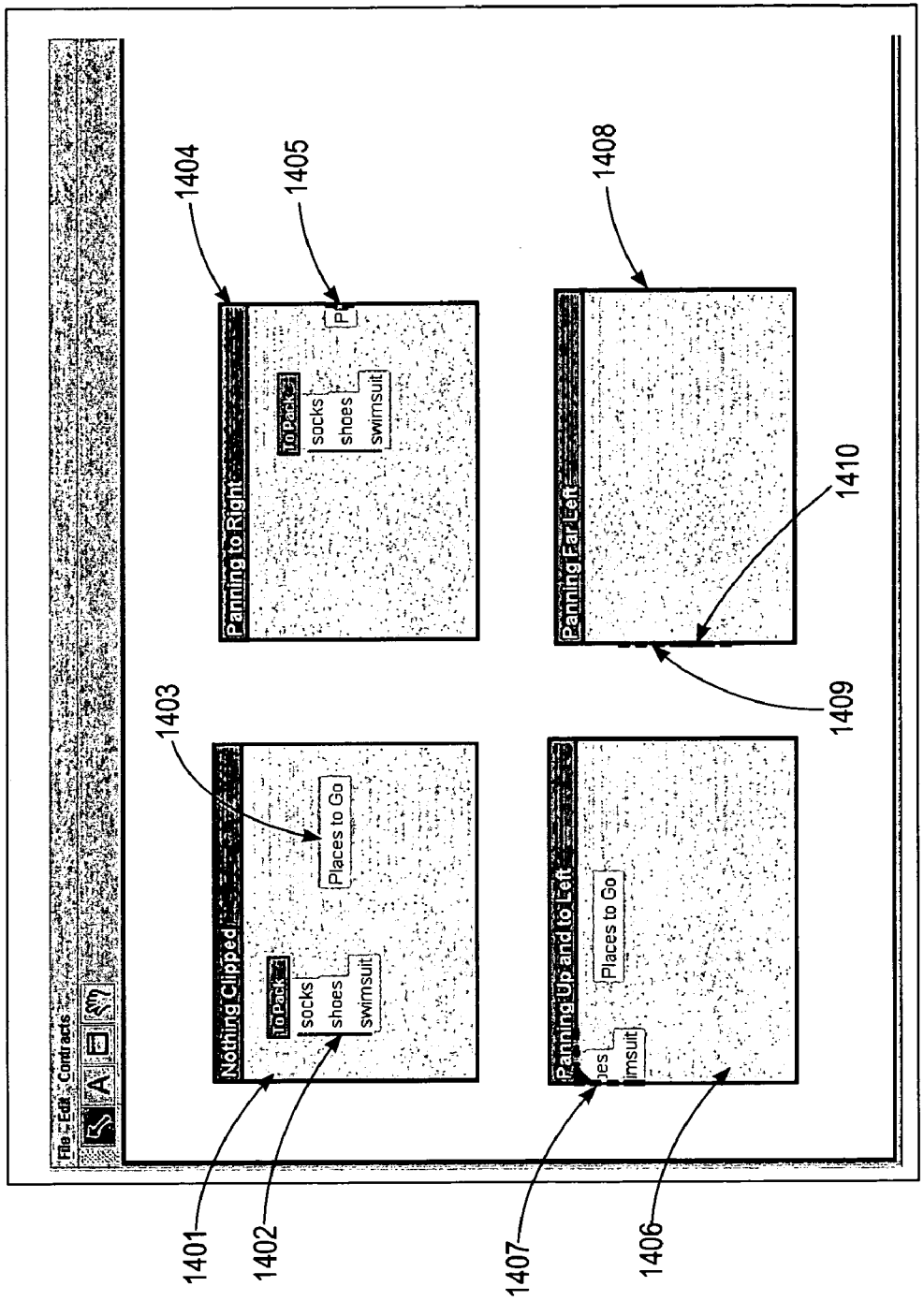
FIG. 14 is an illustration of a "viewed space" that is panned to various positions in a "populated space" resulting in clipped objects as may be performed in the currently preferred embodiment.

Preferably, the computation of the peripheral awareness indicators in the currently preferred embodiment is fast enough to allow them to be computed and re-displayed in real time when a space is being panned. FIG. 14 illustrates several versions of spaces with the same contents but panned to different points. Referring to FIG. 14, space 1401 has no clipping of information objects 1402 or 1403. At 1404 a panning of space 1401 to the right causes clipping of information object 1403 and a resulting indicator 1405. At 1406 a panning of space 1401 up and to the left causes information object 1402 to be clipped and a resulting indicator 1407. At 1408, a panning of space 1401 far to the left causes both the information objects 1402 and 1403 to be clipped and display of resulting indicators 1409 and 1410.

Figure 15:
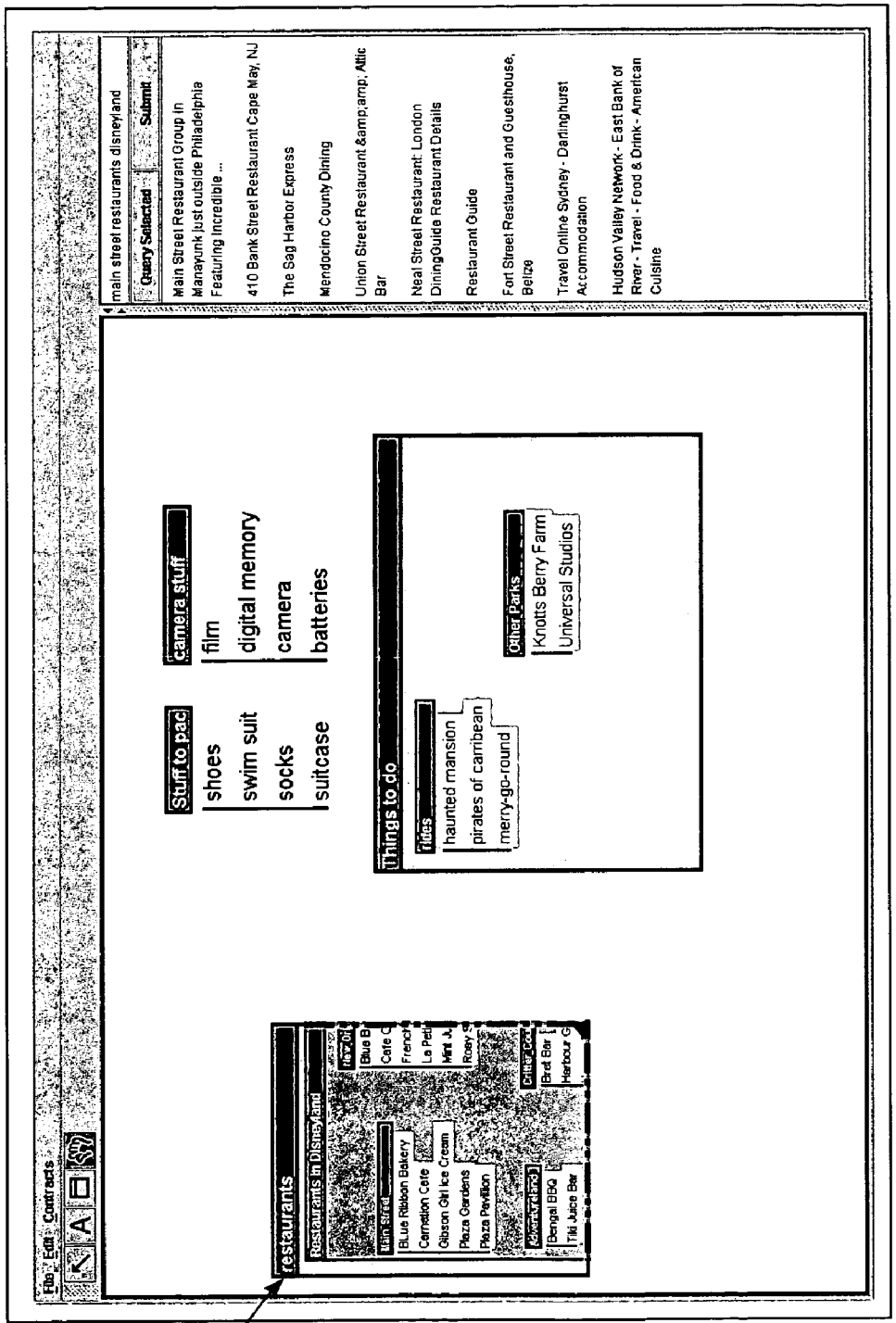
FIGS. 15-16 are an illustration of before and after "zooming" a space so that it covers the entire writing workspace as may be performed in the currently preferred embodiment.

As a user works in the writing space, it is sometimes important to be able to zoom down to work on the details of a contained subspace. A zooming operation on a space will cause it to expand to fill the display area of the entire writing workspace. FIG. 15 shows an example of a session where much of the information in the "restaurants" space 1501 is clipped.

Figure 16:
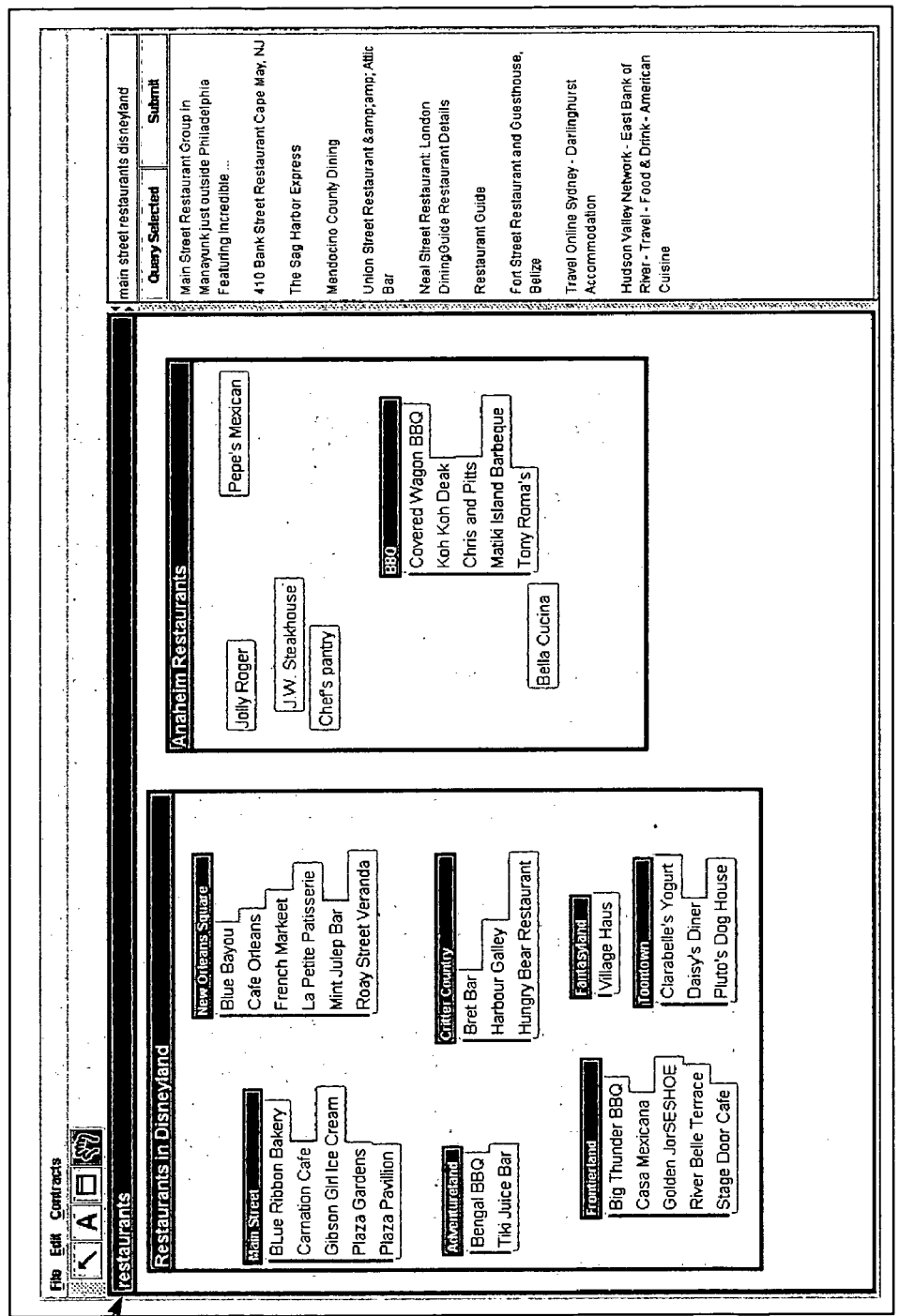

FIG. 16 shows the effects of zooming in on the restaurant space 1501 to enable working on the details of its contents. The user can zoom out upon completion of working on the details to restore the view to the overall space. The manner in which zooming is performed and enabled is inherent in the graphical toolkit used to implement the sensemaking application.

Operations Governing Interaction Behaviors

The contracts described above focus mainly on the allocation of static display space. In the following, what is described are operations that govern the moving, growing, and bumping of information display objects.

Since the spatial organization of objects is used to convey meaning, the system provides operations for moving objects. The user operations for moving an object follows a sequence typical for those used in graphical user interfaces. The user first moves the cursor over the target object and clicks on it to select it. Still pressing the mouse button, the user then moves the object so that the cursor is over the place where the object is to be placed. Releasing the mouse button drops the object. It should be noted that in the currently preferred embodiment, that prior to releasing the mouse button and dropping the object, the described actions will occur. This could enable a user to decide if this is the desired course of action to be taken. If the user does not drop the object, the system, and the visually displayed objects, will revert back to their original state. This is illustrated in FIGS. 17 and 18.

Figure 17:
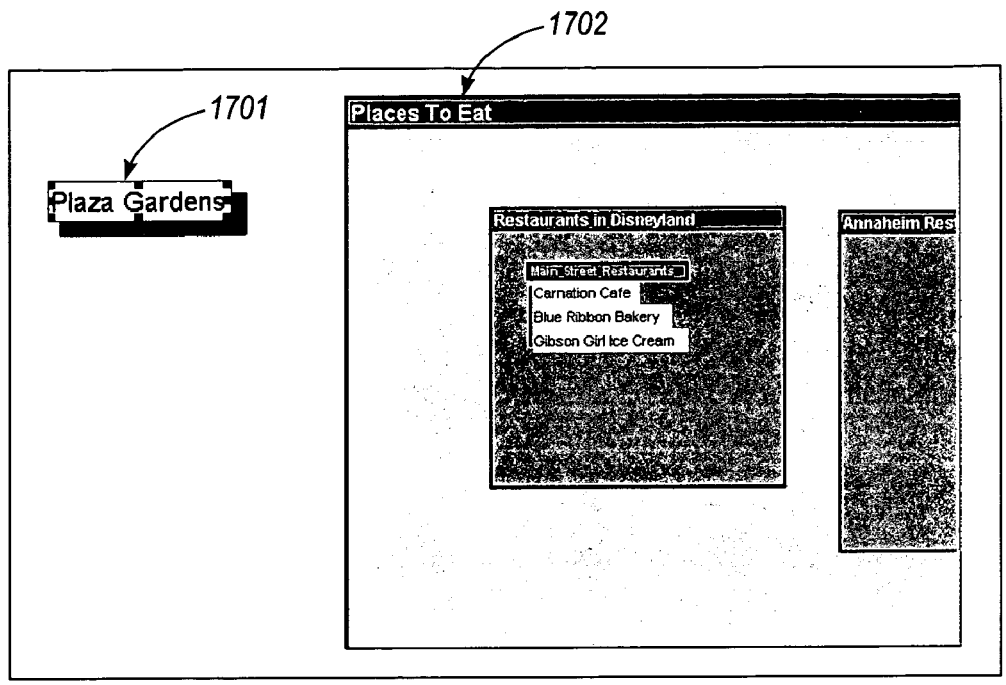
FIGS. 17-19 illustrate the visual cues indicating movement and the visual scaling that occurs as a visual information object is positioned into another visual information object as may be performed in the currently preferred embodiment.
Figure 18:
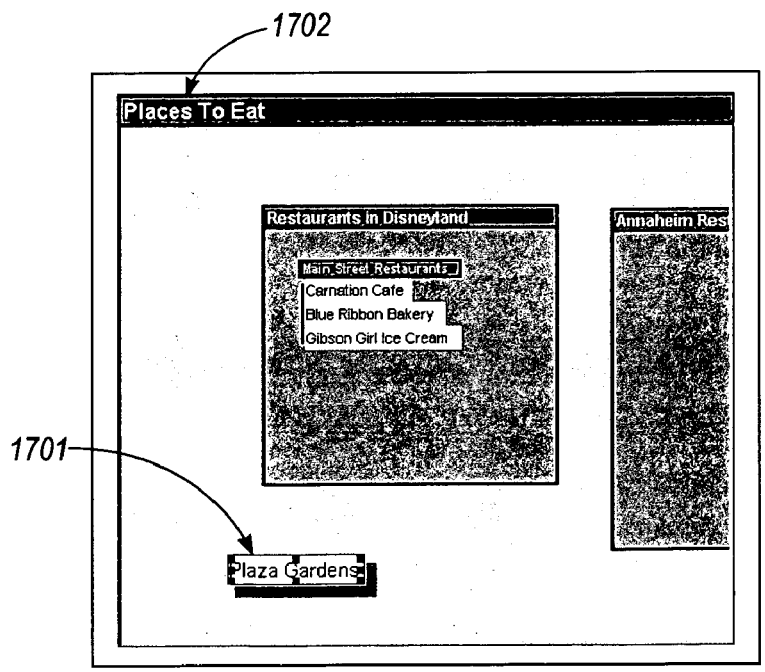

FIG. 17 shows the first stage of moving an object. The text box 1701 "Plaza Gardens" has been selected. While the mouse button is depressed, the text box 1701 is floated "above" the space as indicated by the drop shadow 1702. This procedure for selecting an object works the same for all kinds of visual information objects. It also works when a collection of objects is selected and moved at once.

Automatic Scaling: Moving Objects Into Subspaces

Figure 19:
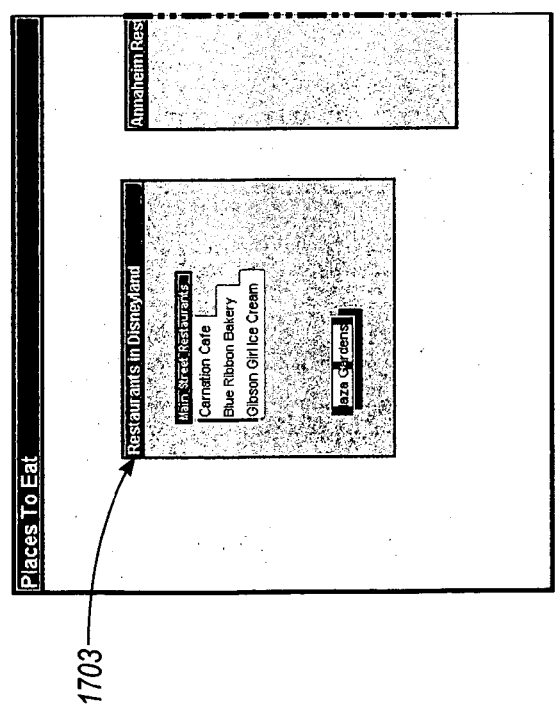

In this example, the user proceeds to move the text box 1701 into the "Places to Eat" space 1702. In the system of the currently preferred embodiment, spaces reduce the scale for objects contained within them, so the floating image of the text box 1701 immediately reduces in size as shown in FIG. 18. The text box 1701 reduces in size further as the user moves deeper into the hierarchy of spaces to the "Restaurants in Disneyland" space 1703 as shown in FIG. 19.

Automatic List Growth: Moving Objects Into Lists

Figure 20:
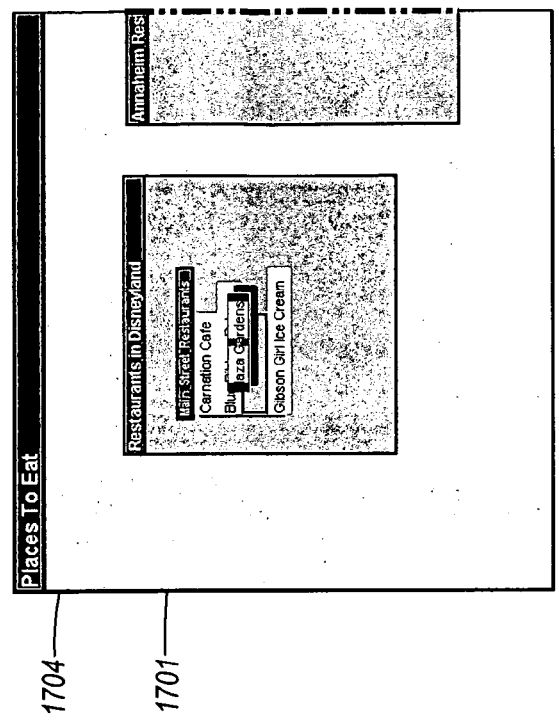
FIG. 20 is an illustration building on FIGS. 17-19 wherein animation occurs when a text box visual information object is moved and inserted into a list visual information object as may be performed in the currently preferred embodiment.

The user next moves the "Plaza Gardens" text box 1701 over the list "Main Street Restaurants" 1704. The list 1704 fluidly grows to make space for the new item. FIG. 20 shows how list items move out of the way to make space as the floating text box is moved over the list.

These examples show how the contracts for display of an object interact in a fluid way when objects are moved in the system—reducing the scale of objects as they move over spaces or making room for an object in a list. Collectively, they support the user in being able to gracefully move an object using a single, simple gesture, without needing to attend to details of scaling, making room, or re-arranging other objects.

Figure 23:
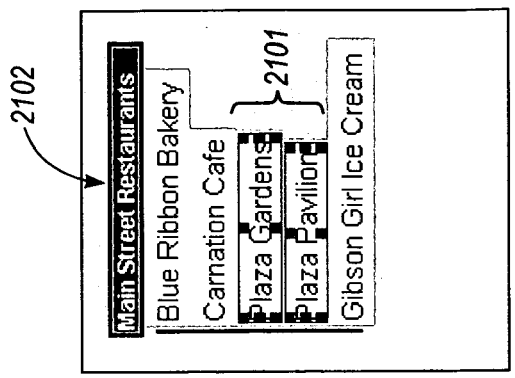
FIGS. 21-23 illustrates the steps for moving a group of objects into a list object as may be performed in the currently preferred embodiment.
Figure 22:
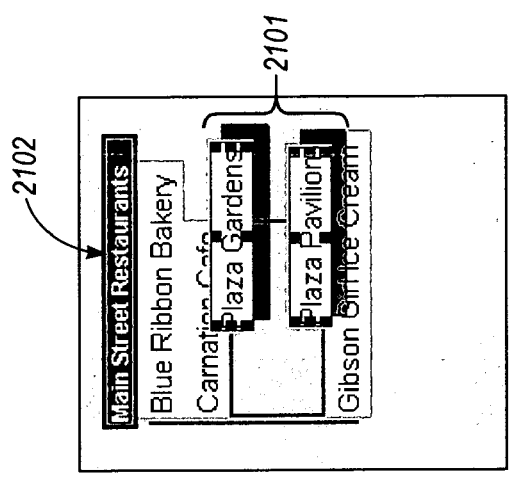
Figure 21:
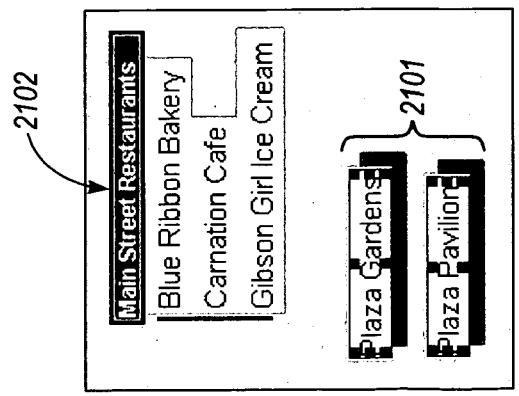

FIGS. 21-23 shows three steps of moving a group of items into a list. Referring to FIG. 21, first the user selects a set of items 2101. In this case, the user first selects the "Plaza Gardens" text box and then extends the group with the "Plaza Pavilion" text box. This is carried out in the familiar fashion by holding the shift key while making the second selection. While the user moves the group the system displays a drop shadow under each of the items. Referring to FIG. 22, as the cursor moves over the list "Main Street Restaurants" 2102 the system opens enough space for the two items in the list. The user can move the cursor up and down over the list to select the location of the placement. Finally, referring to FIG. 23, when the user releases the mouse button, the items are dropped into the list. The list contracts align the items and assure that their size is made uniform with the other items in the list.

Stepping on the Soap: Placing an Object Between Two Objects

Figure 25:
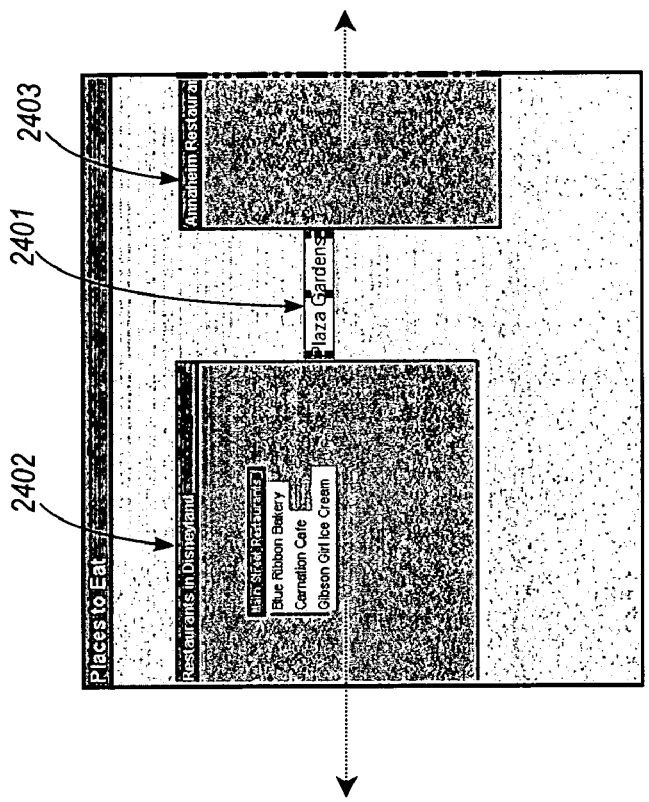
FIGS. 24-25 illustrates the resultant automatic object movement when placing an object between two or more other objects as may be performed in the currently preferred embodiment.

Interactions can also occur over white space. When an object is dropped between two objects and there is not enough room to display the object in that location, the objects move out of the way to make room for it. This action is referred to as "stepping on the soap", to suggest the way a slippery bar of soap can shoot out from under your foot if you step on it in the shower. The system selects an object to move and a direction to move it that minimizes the overall perturbation as illustrated in FIGS. 24 and 25.

Figure 24:
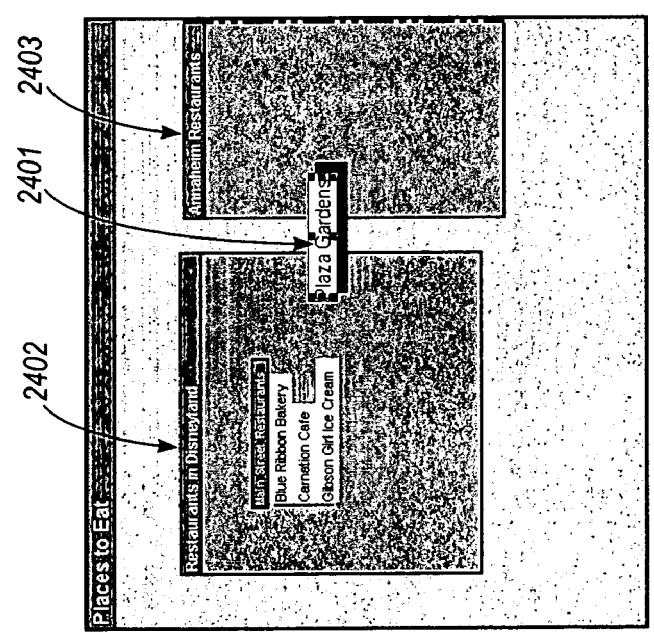

Referring to FIG. 24, a user positions a floating object 2401 between two stationary objects 2402 and 2403 before dropping it. Referring to FIG. 25, when the user drops the floating object 2401, the action causes the objects 2402 and 2403 to move out of the way.

The Snowplow: Using an Object to Move Other Objects

"Snowplow" is an alternate contract for moving an object "on" the surface, and may be instigated by the user selecting an object and initiating an action indicating that the snowplow mode be invoked. Invoking the snowplow mode causes the drop shadow to disappear and the user can use the moving object to push other objects around. When any edge of the moving object touches another object, the other object is pushed in whatever direction the user pushes. The user can push a number of objects into any configuration. Terminating the snowplow mode, e.g. by lifting the shift key, ends snowplow mode and causes the moving object to again float above the surface and display a drop shadow. In either mode, the moving object is released when the cursor control button is released indicating the object is no longer selected.

Figure 29:
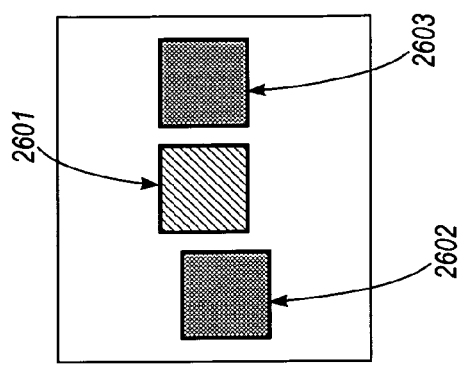
FIGS. 26-29 shows a sequence of steps that illustrate the use of a visual information object to cause movement of other visual information objects through "bumping" as may be performed in the currently preferred embodiment.
Figure 28:
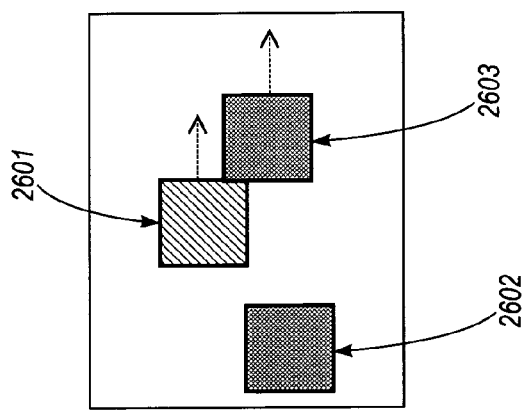
Figure 27:
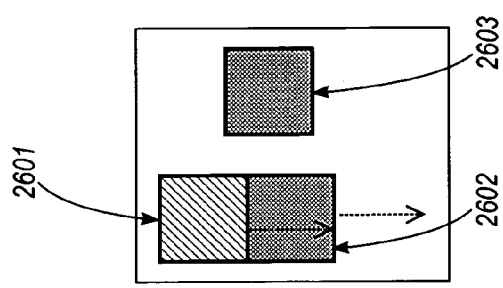
Figure 26:
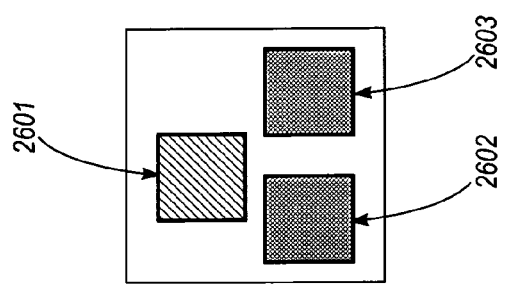

The "snowplow" operation is illustrated with reference to FIGS. 26-29. Referring to FIG. 26, an object 2601 has been selected and the shift key depressed. The desired end effect is to have object 2601 positioned between objects 2602 and 2603. Note that in FIG. 26, there is not enough room between the objects 2602 or 2603 for it to be placed. For example, for object 2601 representing a space, it may be desirable to have it positioned between another space, object 2602 and a text box 2603. In any event, referring to FIG. 27, object 2601 is used to move object 2602 to the left. In FIG. 28, object 2601 is used to move object 2603 to the right. As illustrated in FIG. 29, there is now enough room between objects 2602 and 2603 for object 2601 to be positioned. It should be noted that the "soap" operation may also have been used to obtain the desired effect for the example illustrated in FIGS. 26-29.

Many of the actions of movement—making space in a list, stepping on the soap, or snowplow mode—are all effects of the "no occlusion" rule in contracts for visual information objects. Another consequence of this rule is that whenever the movement of one object causes it to bump into another, the second object is also moved. Bumping is transitive: all of the objects that bump cause the other objects that they bump to move.

The no occlusion rule in contracts can have effects for any operation that changes the area that a visual information object might occupy. The previous section illustrated actions triggered when a sensemaker moves an object, including scaling and bumping. Described below are further effects of the no occlusion rule.

Automatic Bumping: Growing an Object Into Another

Bumping can also be triggered when an object grows. A text box can grow when a user adds more text to it and a list grows when a user adds more items to it. Any visual information object can grow if the user explicitly changes its scale. An object can also occupy more space if a user selects it and then reallocates the space assigned to it. Grabbing and stretching the corners of a text box can cause it to change its aspect ratio. Grabbing and stretching the corners of a space changes the area available for the "viewed space." When any of these operations would cause an object to occlude another object, the system bumps the second object so that no occlusion occurs.

Automatic Panning: Keeping Text Entry in View

Figure 32:
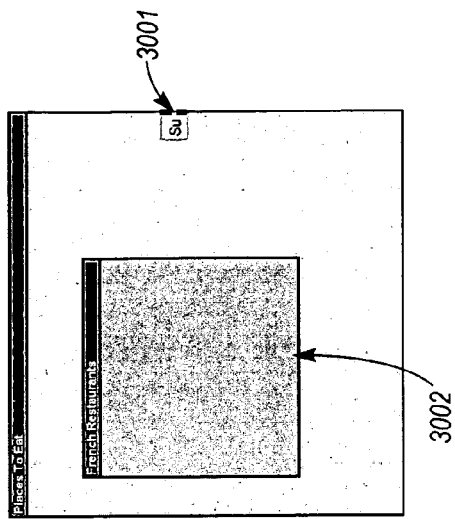
FIGS. 30-32 illustrate the automatic panning of a viewed space in order to maintain text entry in view as may be performed in the currently preferred embodiment.
Figure 31:
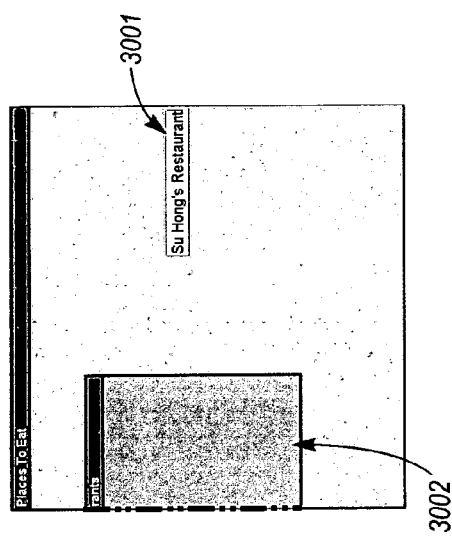
Figure 30:
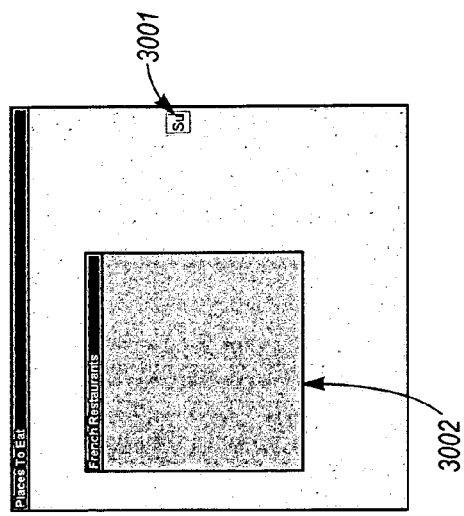

Growth of a visual information object can also cause panning of the viewed space. FIGS. 30-32 shows a sequence in which panning occurs. Referring to FIG. 30, a user starts typing the text "Su Hong's Restaurant" into a text box 3001 at the edge of the "Places to Eat" space 3002. As illustrated in FIG. 31, in order to keep the typing region in view as the text box grows to the right, the system pans the containing space to the left. When the user finishes typing, as illustrated in FIG. 32, the space is restored to its former position so that the text box 3001 is clipped.

The same effect occurs if a user adds information to a list that is near the edge of a containing space. The space pans automatically while the user is working on the list and restores the viewed space to the original pan position when the user selects another object.

Zoom-Anti-Zoom: an Alternative to Bumping and Panning for Adding Material

An alternative technique for governing the growth of text boxes is one that is termed "Zoom-Anti-Zoom" or "ZAZ." The intended effect of ZAZ is to enable a user to stay focused on entering new text without causing the text box to bump into other objects. Instead, the ZAZ contract automatically changes the scale (roughly the font size) and camera position for rendering of the text boxes. The manner of representation and rendering of visual information objects is described in greater detail below. In effect, the text gets smaller as the box gets more full. Since this approach would eventually have the effect of making the text too small to see, the system also "moves the user closer" to the text so that its apparent size stays about the same. When the user selects another object, the containing space is restored to its original scale and the text appears in its greatly reduced size. The user can then move it or scale it as desired.

Figure 34:
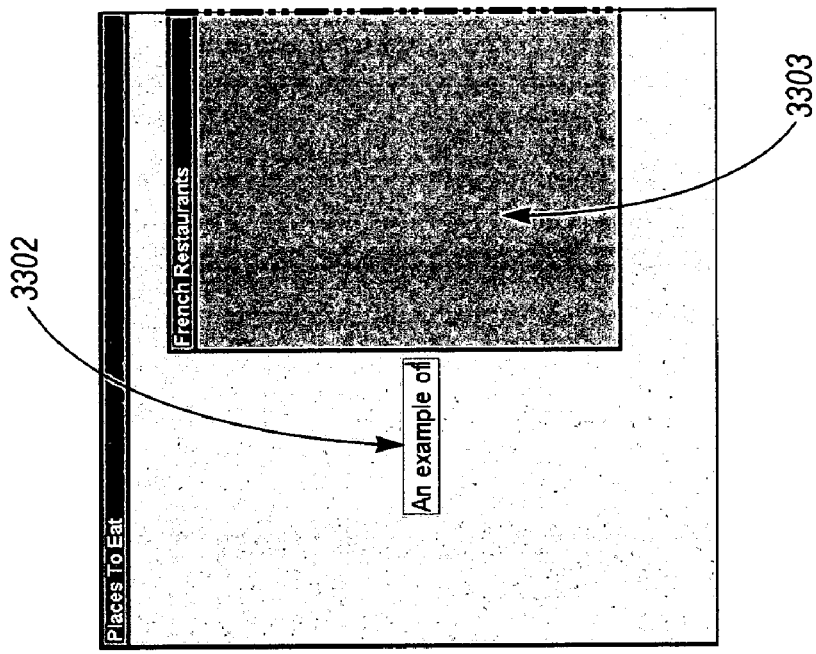
FIGS. 33-36 illustrate a technique for entering text into a text box that avoids "bumping" other objects yet maintains a constant user perception of text entry size as may be performed in the currently preferred embodiment.
Figure 33:
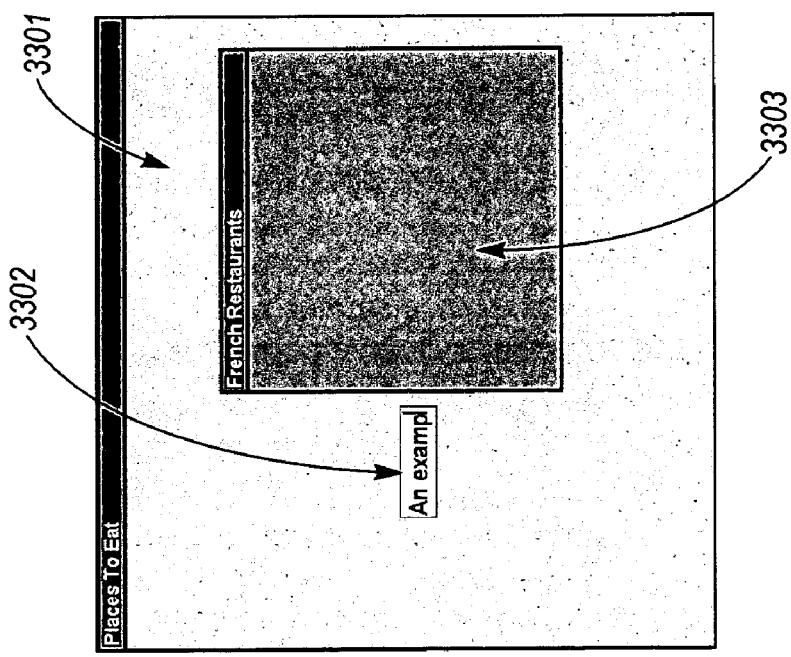
Figure 36:
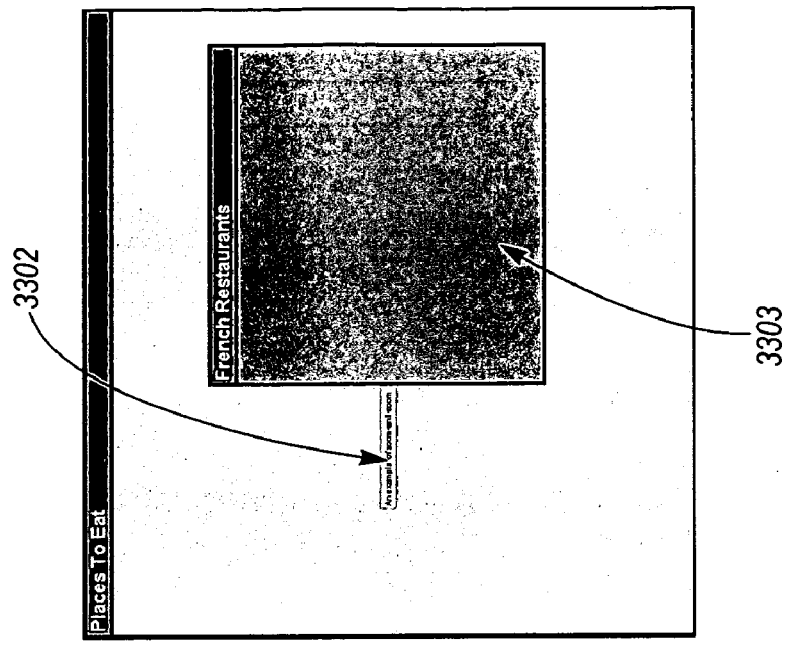
Figure 35:
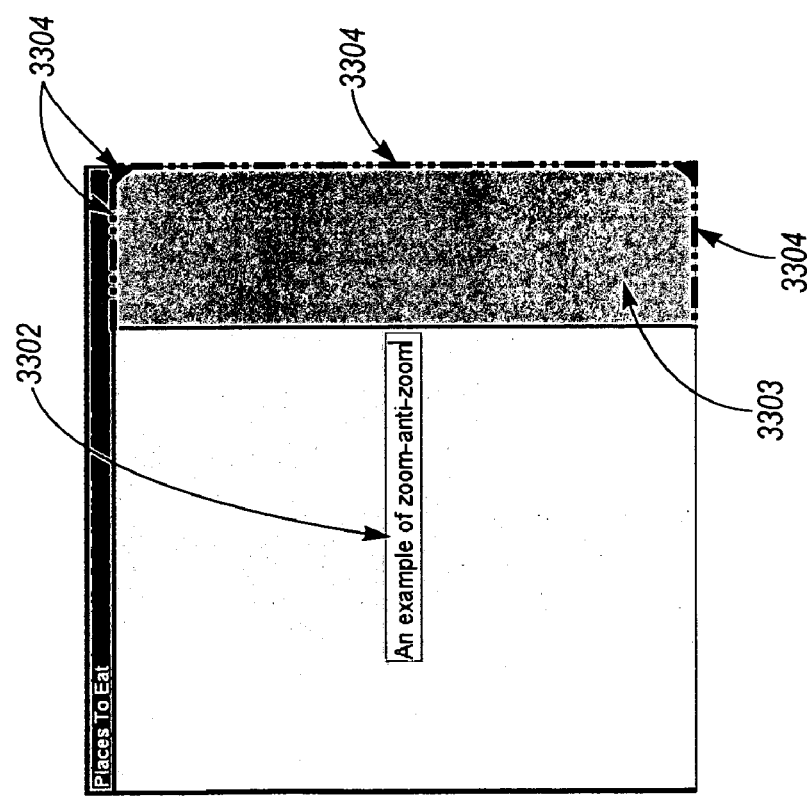

This combination of scaling the text and the background simultaneously is illustrated by the sequence in FIGS. 33-36. Referring to FIG. 33, a user is operating in space 3301 and entering text into text box 3302. It is noticed that as text is entered it will "bump" into subspace 3303. Referring now to FIG. 34, it is observed that the "size" of the text in the text box 3302 appears to be the same (the effect of the increased scaling), but also, subspace 3303 appears to grow in size (the effect of zooming in). Referring to FIG. 35, the scaling of text in text box 3302 continues as does the zooming. Zooming is now to the extent that vertical limits of subspace 3303 exceed the bounds of the view area of space 3301. Thus, city lights indicators 3304 are displayed. Finally, referring to FIG. 36 when the user leaves text entry mode, the original view is restored. Note that the text is now displayed in a much reduced scale corresponding to the amount of text entered.

Figure 37:
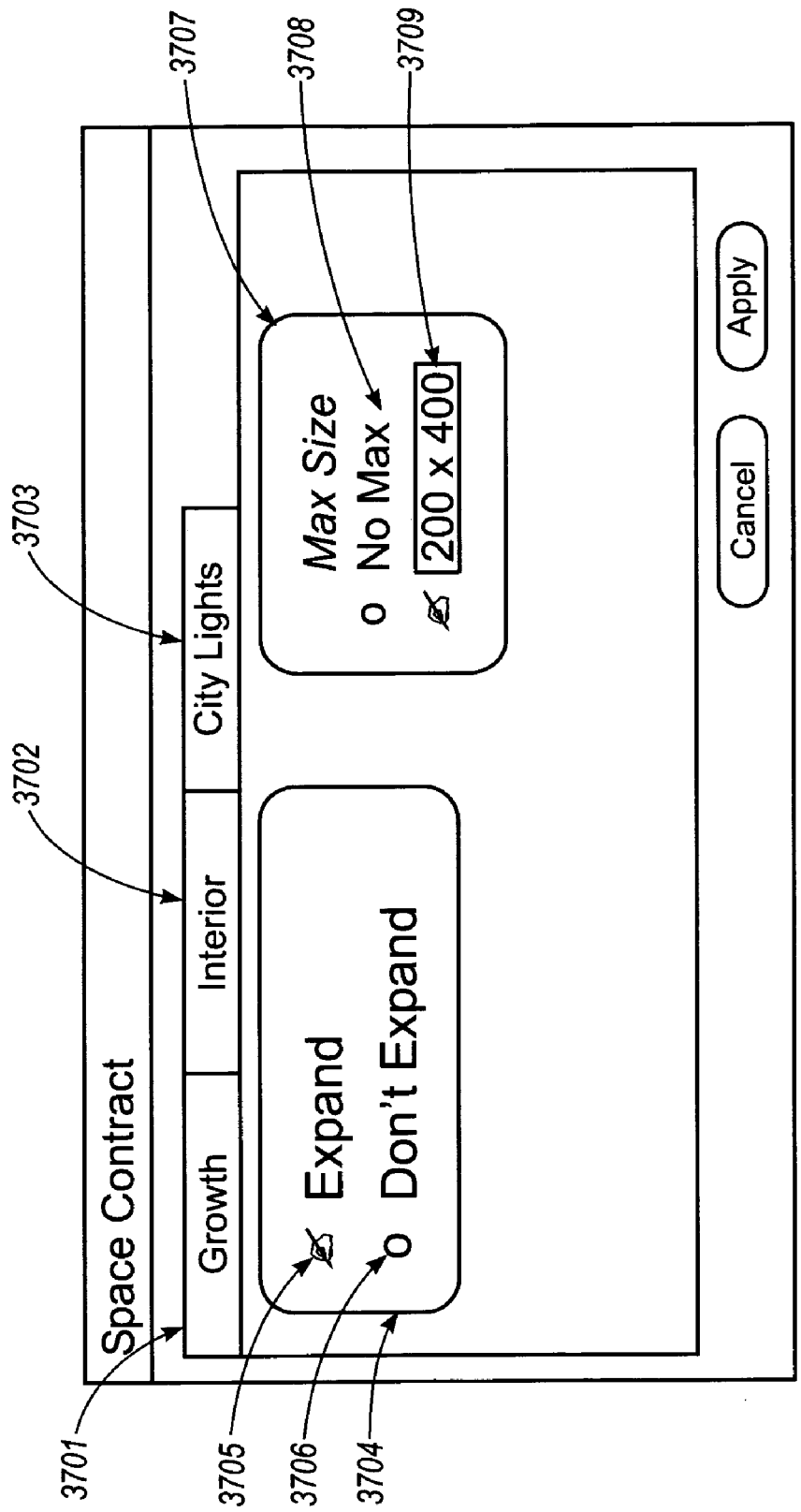
FIGS. 37-38 illustrate a user interface for entering parameters for a contract for a "Space" visual information object as may be utilized in the currently preferred embodiment.
Figure 38:
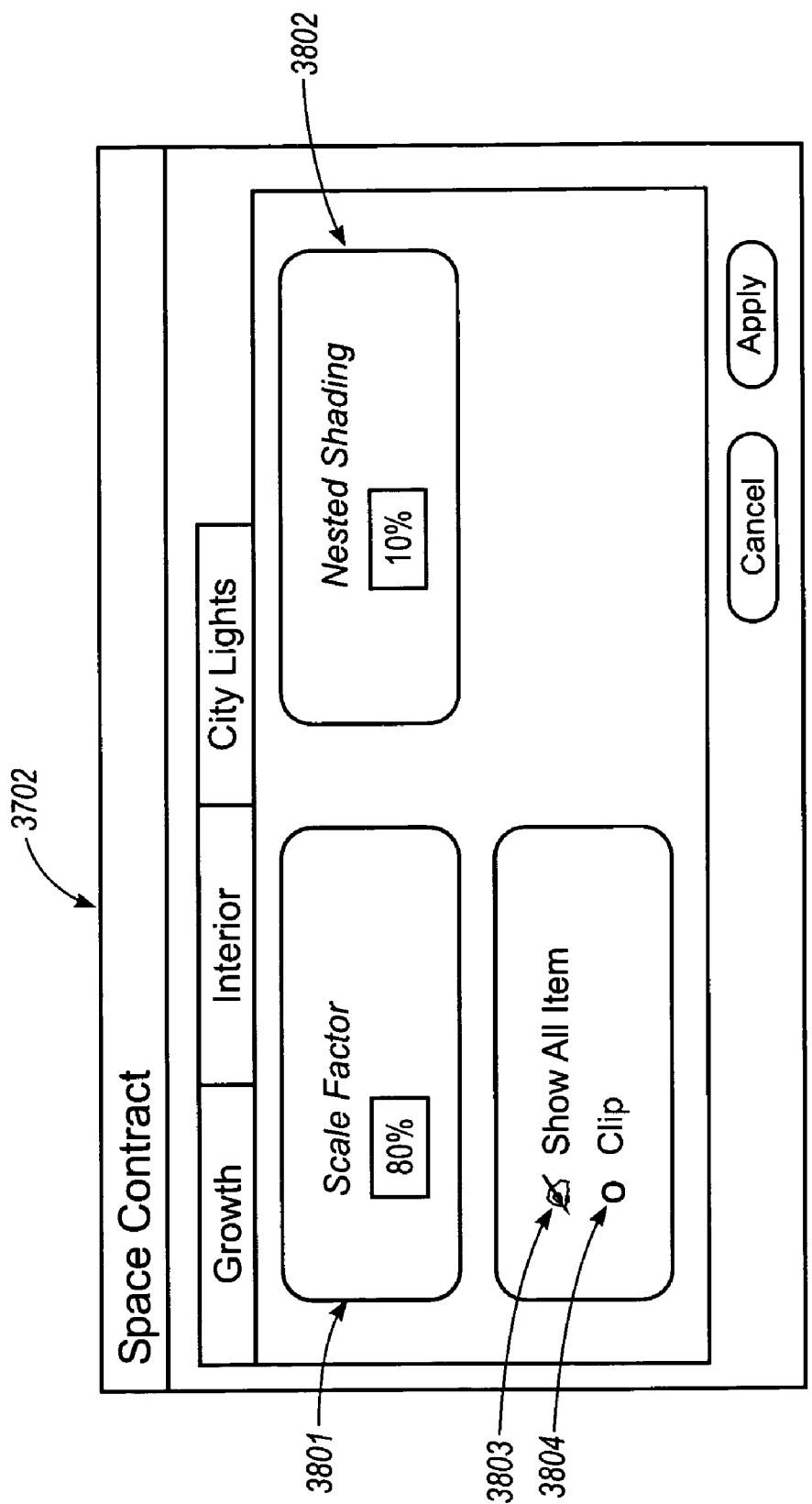
Figure 39:
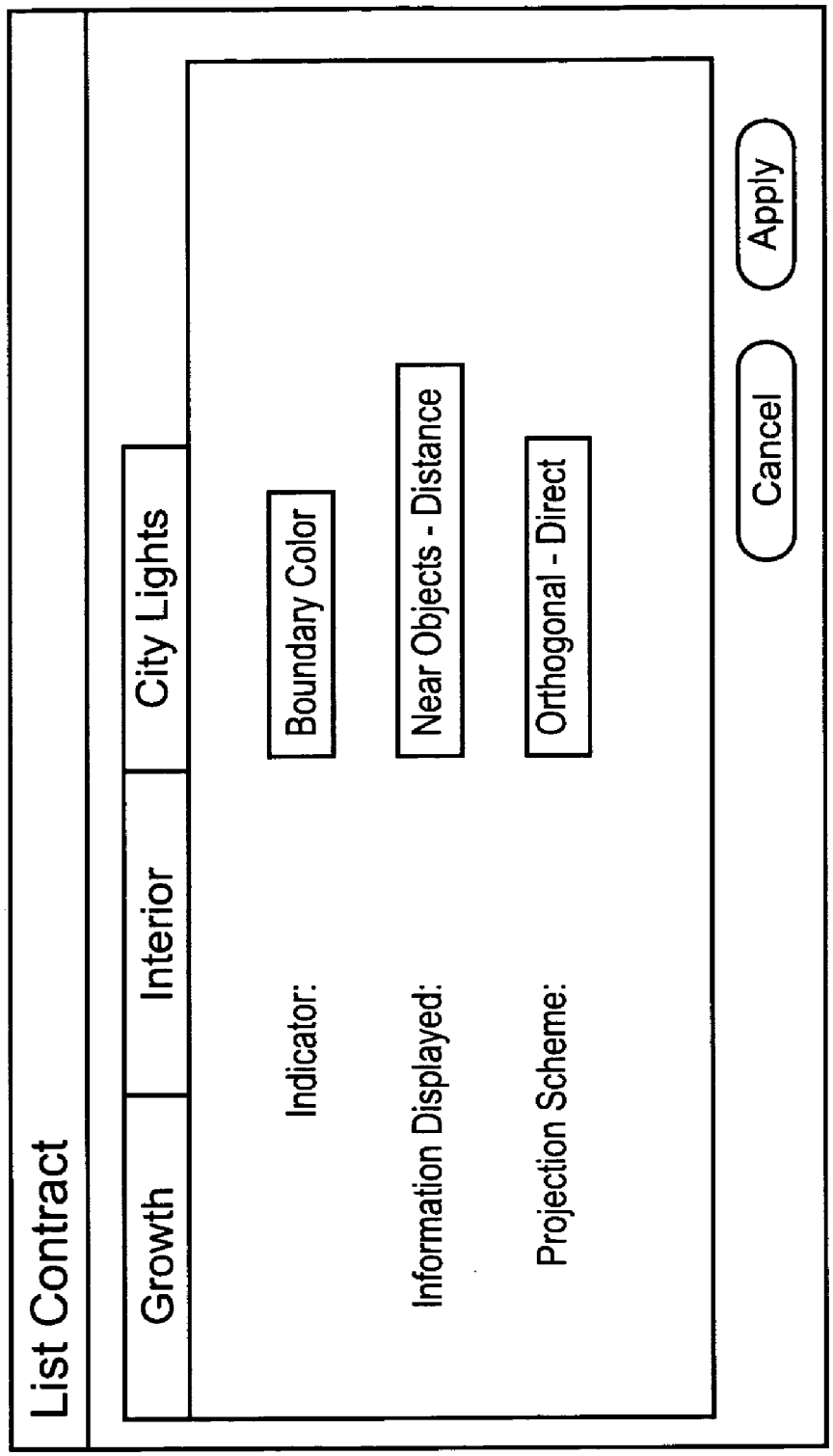
FIGS. 39-40 illustrate a user interface for entering parameters for a contract for a "List" visual information object as may be utilized in the currently preferred embodiment.

Representing Interaction Behaviors and Display Characteristics as Parameterized Contracts In the currently preferred embodiment, contracts are made explicit to represent interaction and display policies as parameterized contracts. The term contracts and policies in this context is meant to indicate how the visual information object will interact with other objects and be displayed when it is itself being interacted with directly or indirectly by the user. The parameters within the contracts may apply to all the visual information objects. Alternatively, a contract may be created to control behavior of an individual visual information object. A description of exemplary user interfaces to these contracts is presented below. It would have been apparent to one of ordinary skill in the art to utilize other well known user interface techniques to provide parameters for such contracts, Contracts for Spaces FIGS. 37-39 illustrate an exemplary user interface for contracts for space visual information objects. FIG. 37 shows a first part of an interface to a contract for spaces. Referring to FIG. 37, there are multiple tabs indicating the different general policies associated with space object interaction behavior and display characteristics, namely growth tab 3701, interior tab 3702 and city lights tab 3703. What is illustrated in FIG. 37 are the items under the growth tab 3701, namely growth policies. Note that traversal to the other policies is accomplished by a familiar point and click operation to the tab representing the other policies. In FIG. 37 a first policy governs the expansion of the space and is indicated in area 3704. By selecting the radio button 3705 for "expand," a user can indicate that a space should grow its display allocation to accommodate crowding on its interior. The "don't expand" radio button 3706 means that it should clip its member contents rather than grow. The "max size" parameters 3707 enable a user to set a maximum size for the space. So a user can either specify no maximum 3708 or some particular maximum 3709.

FIG. 38 shows parameters governing the treatment of interior objects in a space. This is displayed when selecting the interior tab 3702. Referring to FIG. 38, the "scale factor" parameter 3801 governs the reduction in magnification of objects when they are placed into a space. The "nested shading" number 3802 governs the percentage by which increasingly nested spaces become darker. Finally, the radio buttons 3803 and 3804 govern whether the space attempts to display all contained objects, or whether it employs clipping. If the user selects "don't expand" in the growth policy, and "show all items" on the interior policy, then the space will decrease the view's magnification or employ "semantic zooming" in order to show all of the objects in the limited space. Semantic zooming refers to a technique wherein the users viewpoint will be moved.

FIG. 39 shows the parameters governing the City Lights peripheral Awareness Indicators when City Lights Tab 3703 is selected. The "City Lights" tab interface controls parameters for City Lights, such as the indicator type 3901, the information to be represented by the indicator 3902, and the projection scheme to be used to map objects onto the space's perimeter 3903. The indicator type 3901 allows the user to select the physical appearance of the peripheral awareness indicator to be used. As described herein, it is a change of color to the portion of the boundary where the clipped object is mapped. Other indicator types, such as arrows pointing to the clipped object may also be used. The Information indicator 3902 provides for allowing different types of information to be displayed with the indicator. This could include some textual description of the clipped object (e.g. "s" for a space, "l" for a list or "t" for a text box). Finally, the projection scheme indicator 3903 allows a user to alter the projection scheme used. Typically, the scheme is for objects that are orthogonal to a corresponding boundary. In any event, various alternatives for presenting peripheral awareness indicators can be found in co-pending application entitled "Methods and Systems for Indicating Invisible Contents of Workspace", Ser. No. 10/369,617.

Contracts for Lists

Figure 40:
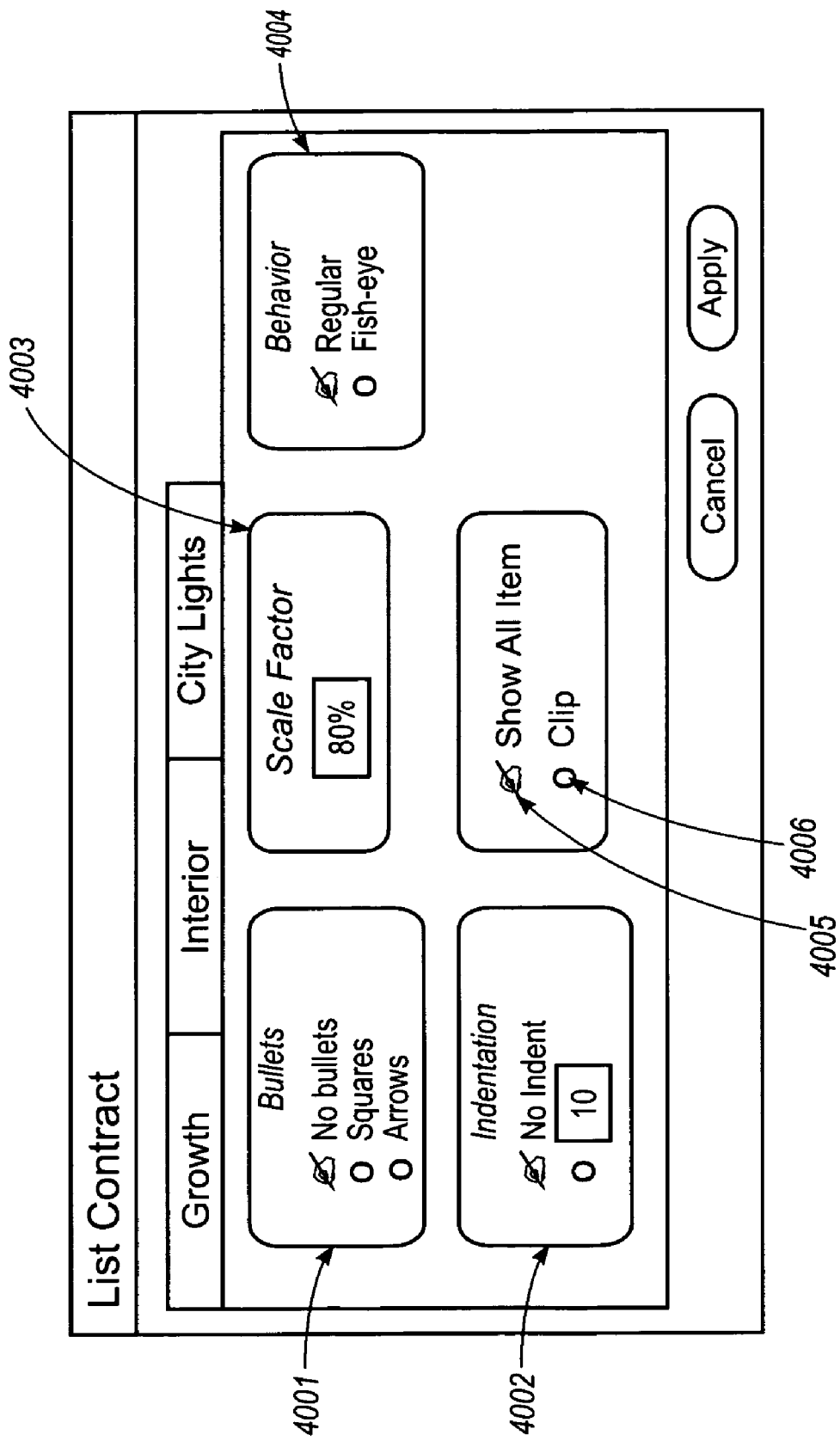

Lists and spaces in the system of the currently preferred embodiment are similar in that both kinds of objects are composite—holding other visual information objects in their interiors. Lists differ from spaces in that they impose an alignment on their interior objects. The contract for growth for lists and for spaces is similar. FIG. 40 shows an example of a user interface to the contract governing interior objects in a list.

The user interface to the interior of a list offers controls for formatting, such as whether the elements of a list have a leading "bullet" 4001 and whether items are indented 4002. It also offers controls governing the magnification of items moved into a list 4003. Behavior controls 4004 are offered that can govern scrolling and panning behavior when viewing the contents of a large list based on known techniques such as a fish-eye, focus-context approach. Finally, the radio buttons 4005 and 4006 govern whether the list attempts to display all objects in the area provided for the list, or whether it employs clipping. The resulting behaviors are similar as those for the Space object.

Contracts for Text Boxes

Figure 41:
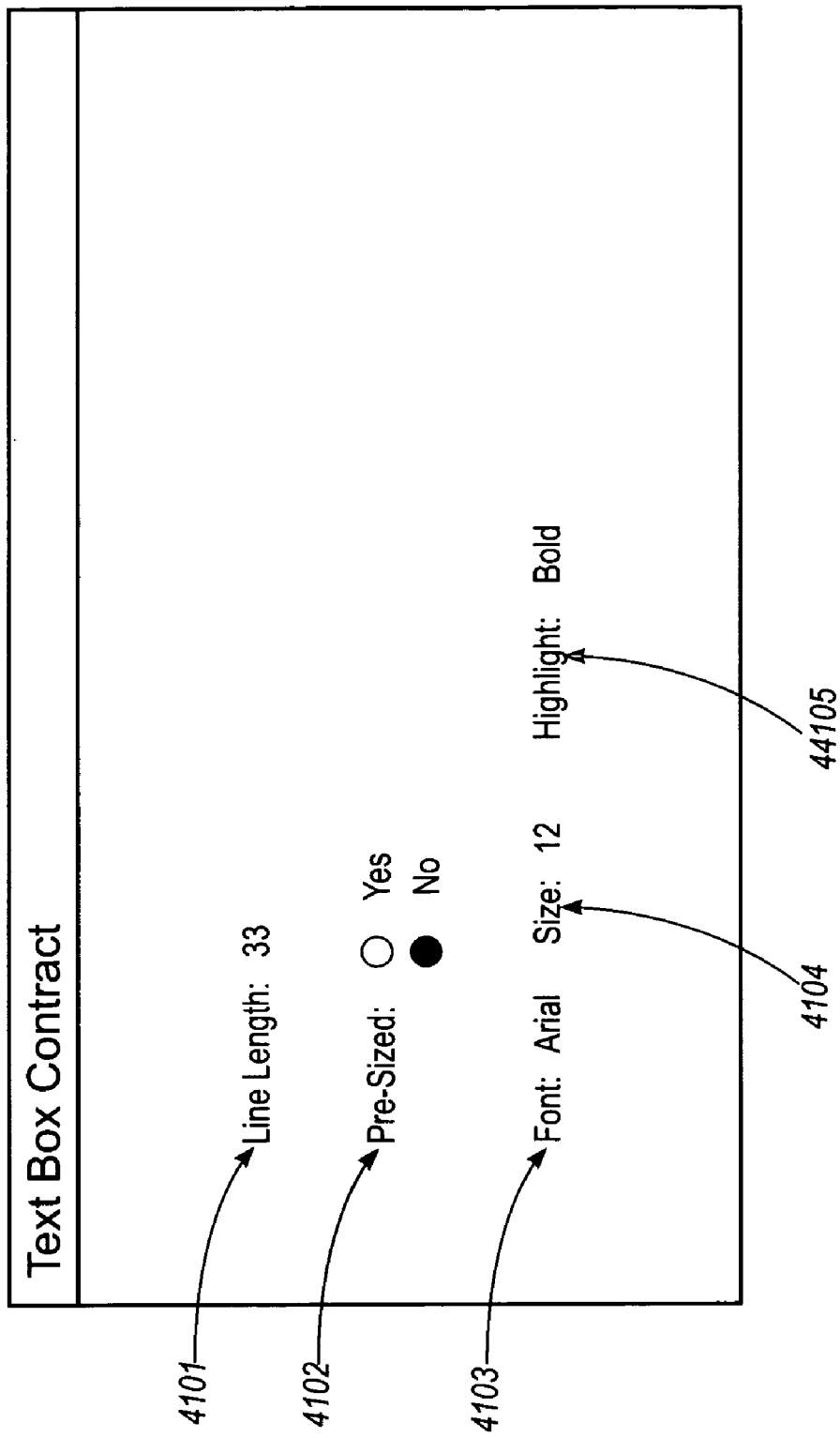
FIG. 41 illustrates a user interface for entering parameters for a contract for a "Text Box" visual information object as may be utilized in the currently preferred embodiment.

FIG. 41 illustrates a user interface for specifying a Text Box contract. Referring to FIG. 41, a first parameter 4101 that may be specified is for the number of characters per line. As illustrated in FIG. 41, the line length is 33 characters. Next, a parameter 4102 may be used to specify if the default text box size is created. In this case, the default text box size is the same as a single line of text. Finally, parameters 4103, 4104 and 4105 are used to specify the textual attributes of font, size and highlights.

Selectable Contracts and the Repair Cycle

A useful feature of the system is a "repair cycle" for easily managing the system's automated behaviors. The user has the option of entering the repair cycle whenever the system makes automated contract adjustments in response to a user action. Once in the repair cycle, the user can undo this previous transaction under the current contract and replay the action under other contracts to find the most satisfying result. A repair cycle is illustrated in FIG. 42.

Figure 42:
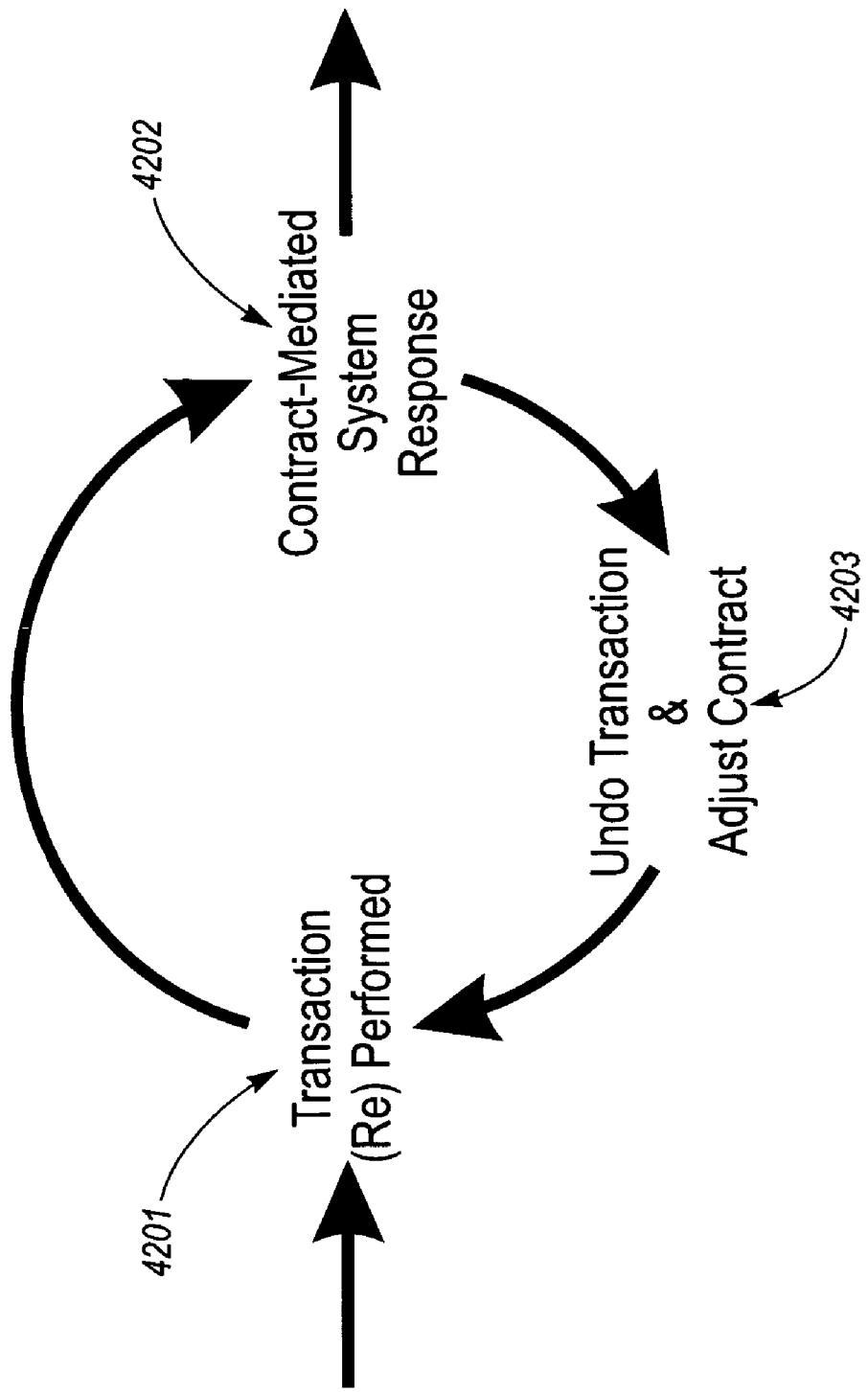
FIG. 42 illustrates the steps of a "repair cycle" for enabling a sequence of actions to be replayed according to different contract parameters as may be utilized in the currently preferred embodiment.

Referring to FIG. 42, the cycle begins when the user completes a transaction 4201 with the system resulting in automatic contract-mediated adjustments 4202. The user can undo the transaction and modify the current contract to preview the results of other contract options 4202. The cycle ends when the user is satisfied with the current contract.

In the example sequence shown in FIGS. 33-36, the current contract on the text box specifies that the text box grow horizontally to accept new text and perform zoom-anti-zoom when competing for space with other objects. In the repair cycle, the user can preview and select alternate contracts such as line wrapping instead of horizontal growth, or bumping instead of zoom-anti-zoom.

The repair cycle is invoked using conventional well known means such as a function option via the menu structure of the sensemaking application and/or a predetermined key combination or sequence on the keyboard. When invoked the user will be presented with an interface to undo the last transaction performed. Once the transaction is "undone", the contract user interface (as described with respect to FIGS. 37-41) for the visual information object initiating the transaction will be presented to the user, to enable the user to select the desired changes. Alternatively, a user may select to alter the contract(s) of a different visual information object.

Software Implementation of the Currently Preferred Embodiment

The currently preferred embodiment is implemented on a computer based system having a "windows" supported Graphical User Interface (GUI), such as Windows from Microsoft Corporation of Redmond Wash., or MAC OS from Apple Computer of Cupertino, Calif. Such a GUI will typically support operations such as "tap" for selecting/deselecting a graphic object or "double tap" for invoking an operation that may be associated with the graphic object being tapped on. Once an object is selected it may be dragged and dropped to a desired location in the workspace. Mechanisms for providing such user interface operations are well known in the art. Thus no further description for creating such UI operations is deemed necessary.

The currently preferred embodiment has been implemented using object oriented programming techniques of the Java programming environment in combination with a 2D graphics toolkit available from the University of Maryland known as JAZZ. The JAZZ toolkit can be used to create graphics based applications. JAZZ utilizes a "scene graph" model that contains the graphic object information used to render a scene. In this case, the scene being rendered is the sensemaking workspace. A scene graph is comprised of a tree structure that contains information about the objects to be rendered for display as well as "cameras" for providing different views. In the currently preferred embodiment, each Visual Information object and camera is represented by a node on the tree structure. As objects are moved, their position within the scene graph will correspondingly change. JAZZ provides a set of tools that may be used to build applications with a zoomable interface. This feature is exploited when implementing the various panning and zooming operations. Further information regarding JAZZ can be found on the World Wide Web at the website for the University of Maryland.

Each Visual Information Object type is defined by a class and each Visual Information Object is an instance of a class. So in the currently preferred embodiment, there is an object class defined for each of the space, list and text objects. As described above, each Visual Information Object has a distinct user interface. In the system of the currently preferred embodiment, such user interface is implemented using tools provided in the Graphics User Interface (GUI) Library known as SWING (which is available on the Java 2 platform from Sun Microsystems). Such user interface tools are part of the class definition for each Visual Information Object type.

Input from a user is responded to by an Event Handler that is also provided by JAZZ. The input could correspond to movement of the cursor control device, selection, deletion, movement or creation of a Visual Information Object.

Figure 43:
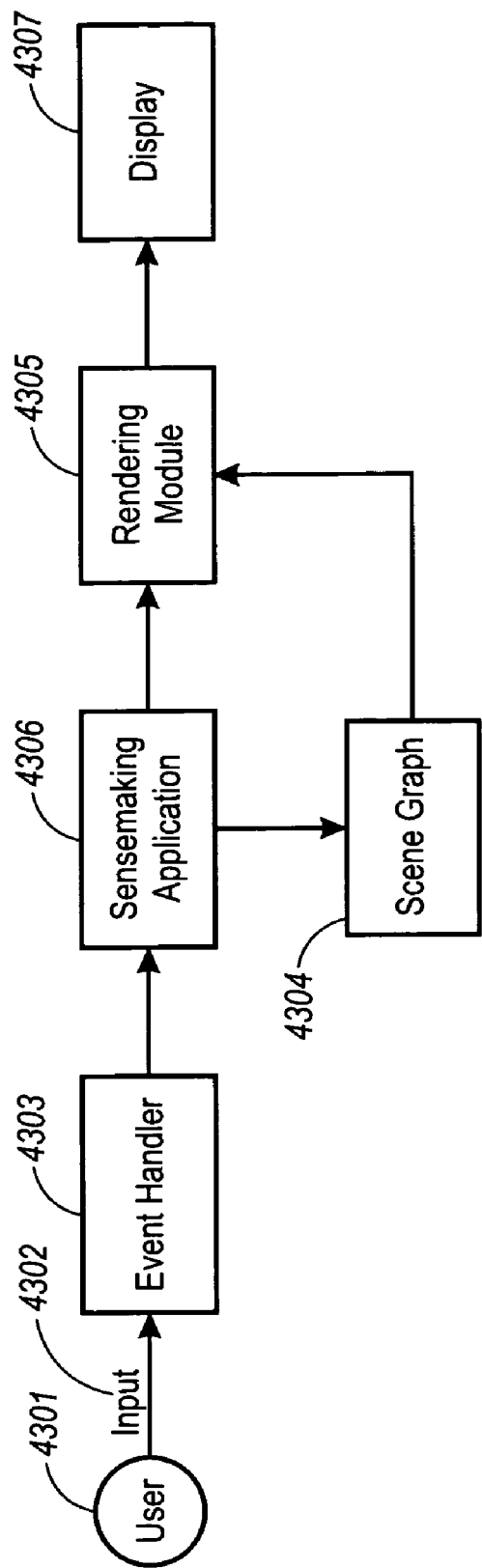
FIG. 43 is a block diagram illustrating a software implementation of the currently preferred embodiment.

FIG. 43 is a block diagram illustrating the basic components of the software implementation of the currently preferred embodiment and does not include basic "operating system" functionality. Referring to FIG. 43, a user 4301 causes an input 4302 which is provided to an Event Handler 4303. The input 4302 may be a movement of the cursor control device, a click and/or hold of a switch associated with a cursor control device (e.g. a mouse button), the depression of a key on a keyboard, etc. In any event, the Event Handler 4303 interprets the input, and passes the information on to the Sensemaking application 4306. The Sensemaking Application 4306 includes all the application specific software implemented logic for the system. Based on the current state of the system, the Sensemaking application 4306 will cause changes to the scene graph 4304 to occur. Such a change may reflect the movement of a Visual information object to a different location within the scene graph or the indication of the use of a different "camera" to be used to render the image to be displayed. In any event, the rendering module 4305 generates the display information for the visual information objects to be shown on display 4307 based on the current state of the scene graph 4305 and information identifying the "camera" from which the scene is to be viewed.

Movement of Visual Information Objects

Figure 44:
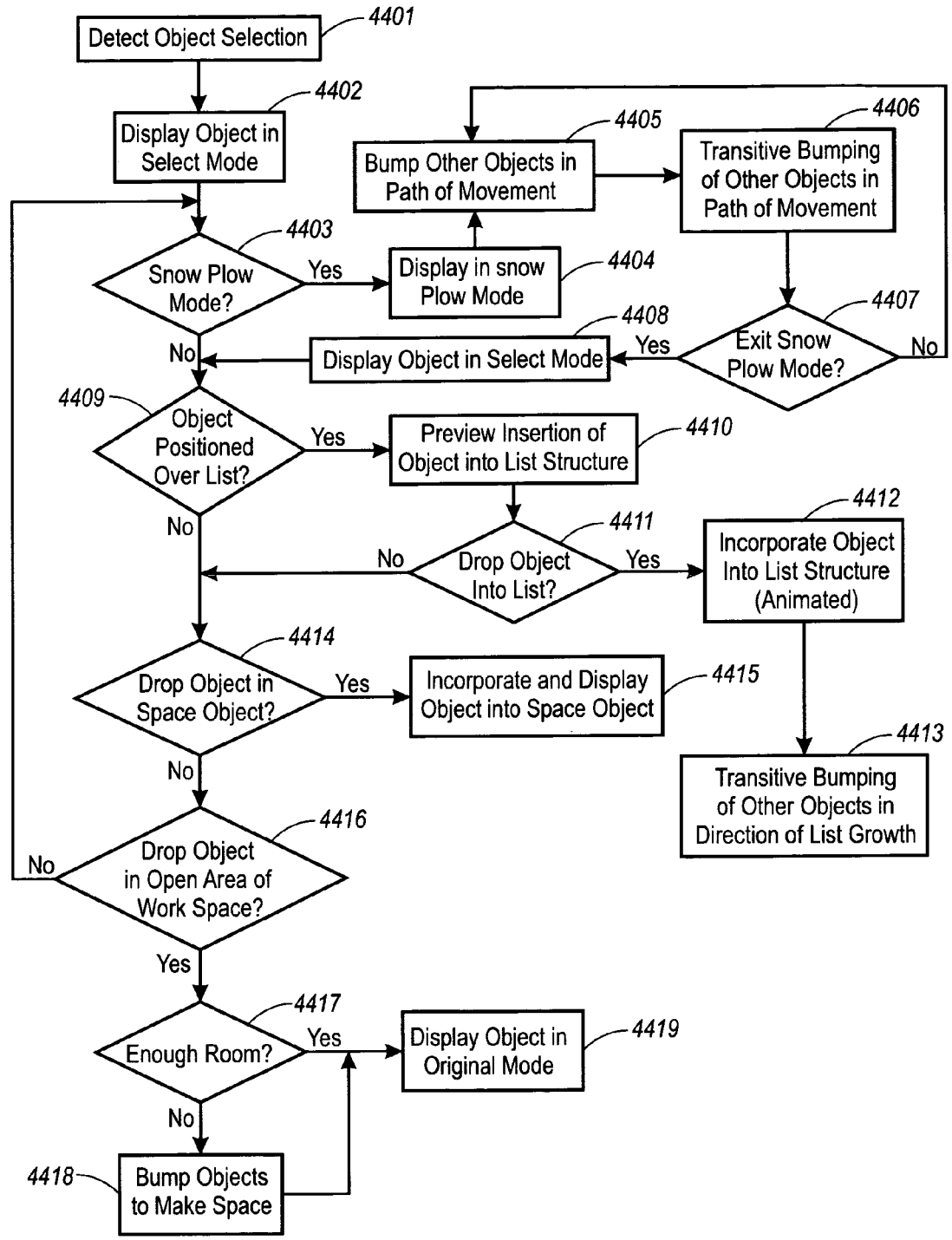
FIG. 44 is flowchart illustrating the basic user flow involved in the movement of visual information objects in the currently preferred embodiment.

FIG. 44 is a flowchart which describes the basic user flow of movement of visual information objects. Note that this description is general so as to encompass all types of visual information objects. Referring to FIG. 44, the first system detects selection of a visual information object, step 4401. This is by conventional means in graphical user interfaces, such as pointing at the visual information object with a cursor control device and depressing a switch associated with the device. Responsive to a selection, the system will display the visual information object in a "select" mode, step 4402. This is also done using conventional means such as displaying the visual information object with a drop shadow. As the visual information object is moved, the system will seek to detect if the user has entered the "snow plow" mode, step 4403. The snow plow mode will enable a user to "push" other visual information objects in an effort to create more room. A user may enter snow plow mode by e.g. depressing a predetermined key on the keyboard, e.g. the shift key, or by other similar means. In any event, if the snow plow mode is detected, the visual information object is then displayed in snow plow mode, step 4404. This is another visually distinct state such as an outlining of the visual information object. As the visual information object is moved by the user via the cursor control device, visual information objects in the path of movement are bumped, step 4405. As described earlier the bumping is done in the direction of movement and is intended to emulate the physical action of bumping another visual information object. Recall that bumping is transitive, so that any other visual information objects in the path of movement are also bumped, step 4406. The system seeks to detect if snow plow mode is exited, step 4407. If it isn't in snow plow mode then bumping continues per step 4405. If it is, then the visual information object is returned to be displayed in "select mode", step 4408.

The system then determines where the visual information object is positioned on the workspace and respond accordingly. In one instance it looks to see if it is positioned over a List structure, step 4409. If it is positioned over a list structure, then a preview of the insertion is presented, step 4410. The system then detects whether it is "dropped" into the list, step 4411. If it is dropped into the List structure, then it is "incorporated" into the list structure, step 4412 and any transitive bumping of other visual information objects as a result of the growth of the list occurs, step 4413. Note that incorporation means that the visual information object dropped takes on various characteristics or attributes of the list into which it is inserted. For example, if a text box is inserted into a text list, then the scale and font of the inserted text box takes on the scale and font of the list.

As movement continues, it is detected if the visual information object is dropped into a space visual information object, step 4414. If it is, then it is incorporated and displayed into the space visual information object, step 4415. Note that in this instance incorporation not only includes incorporating attributes of the space, e.g. scaling, but it will also determine whether or not there is room on the area within the space visual information object and bumping of other visual information objects as described above may occur.

It is determined that the visual information object is to be dropped on an open area on the workspace, step 4416. It is first checked to see if there is enough room in the open area to accommodate the visual information object, step 4417. If yes, the visual information object is dropped and displayed in normal unselected mode, step 4419. If there is not enough room, visual information objects are bumped to make space, step 4418. The visual information object is then displayed in original mode per step 4419. If the visual information object is not dropped, then the system continues detecting for user action per the steps starting at step 4403.

Computer Controlled Display System

Figure 45:
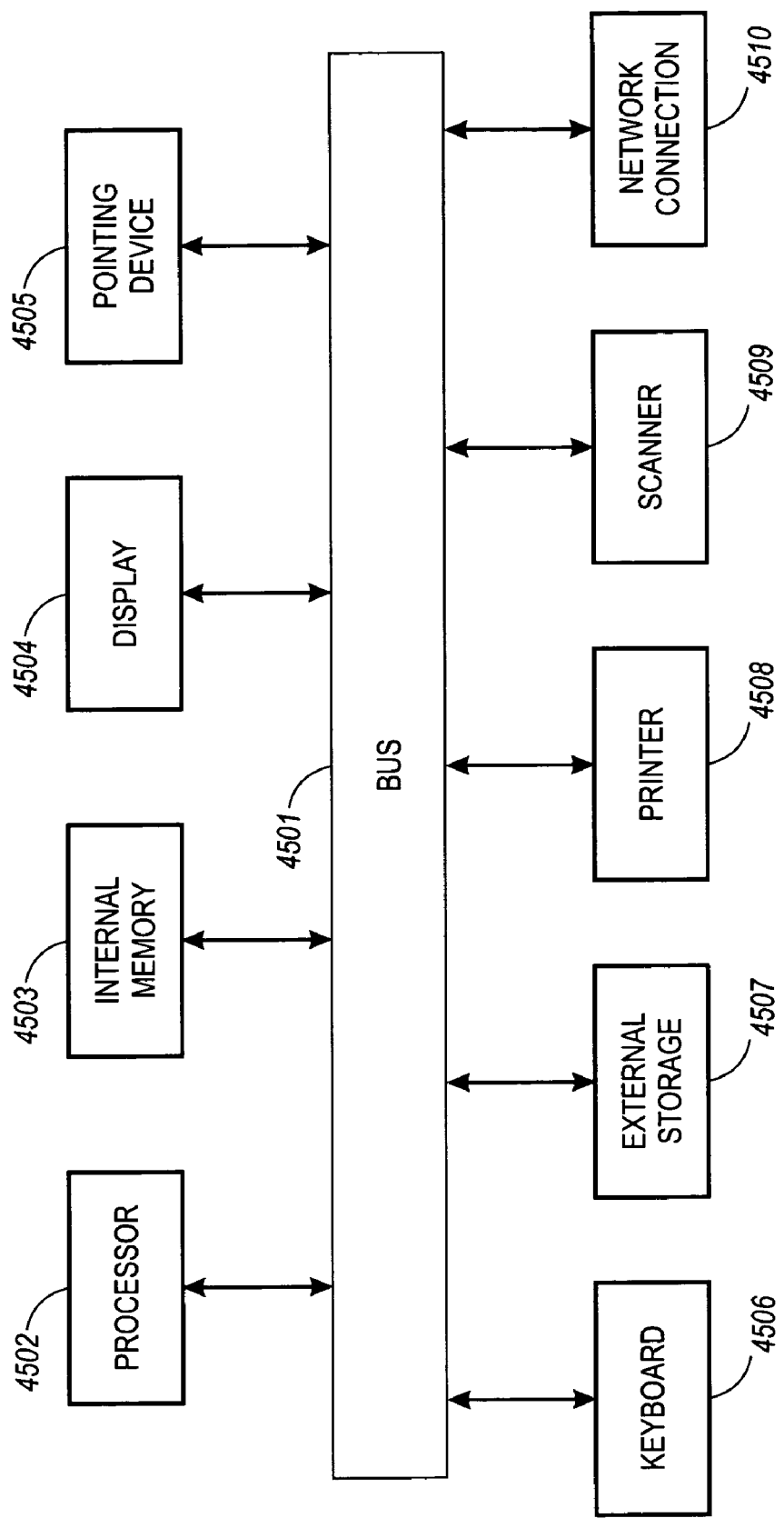
FIG. 45 is a block diagram of a computer controlled system upon which the currently preferred embodiment may be implemented.

The computer controlled display system as may be utilized in the present invention is embodied in the computer based system illustrated with reference to FIG. 45. Referring to FIG. 45, the computer based system is comprised of a plurality of components coupled via a bus 4501. While there may in some to embodiments be multiple instances of the same type of component, only a single instance of each type is described herein. The bus 4501 illustrated here is simplified in order not to obscure the present invention. The bus 4501 may consist of a plurality of parallel buses (e.g. address, data and status buses) as well as a hierarchy of buses (e.g. a processor bus, a local bus and an I/O bus). In any event, the computer system is further comprised of a processor 4502 for executing instructions provided via bus 4501 from Internal memory 4503 (note that the Internal memory 4503 is typically a combination of Random Access or Read Only Memories). When in operation, program instructions for carrying out the various functional components of the present invention are stored in internal memory 4503. The processor 4502 and Internal memory 4503 may be discrete components or a single integrated device. The processor 4502 and internal memory 4503 comprise circuitry for performing the various processing functions described herein. Also coupled to the bus 4501 is external storage 4507. The external storage 4507 is typically a high capacity storage media such as magnetic or optical disk storage.

Also coupled to the bus 4501 is a display 4504 and a pointing device 4505. The pointing device 4505 may be a stylus, mouse, track-ball or other cursor control device. The network connection 4508 provides means for attaching to a network, e.g. a Local Area Network (LAN) card or modem card with appropriate software. Such access may be to the Internet or to local Intranets or both. Besides communication access, the network connection 4508 may be used to access various resources (i.e. servers) such as shared computing, storage or printing resources.

Moreover, the computer controlled display upon which the computer controlled system may be implemented includes the various forms of interactive systems such as electronic whiteboards, laptop or workstation computers, Personal Digital Assistants, Notebook computers, mainframe systems, client-server systems and the like. Further, the system may be "dedicated" to the sensemaking activity or could be part of a general purpose computer based system.

Finally, it should be noted that the invention has been described in relation to software implementations, but the invention may be implemented with specialized hardware built to operate in a systems architecture as described above.

Although the invention has been described in relation to various implementations, together with modifications, variations, and extensions thereof, other implementations, modifications, variations, and extensions are within the scope of the invention. The invention is therefore not limited by the description contained herein or by the drawings, but only by the claims.

What is claimed is:

1. A computer controlled free form sensemaking system for user creation and user control of a plurality of visual information objects, each visual information object having one or more associated contracts for defining automatic behavior responsive to an interaction with other visual information objects, the system comprising:

one or more input elements for enabling creation and modification of the visual information objects, including information contained within the visual information objects;

a display for showing a viewed space that is contained within a populated space, the viewed space including user perceptible representations of the visual information objects located inside the populated space and outside the viewed space;

a processing element for generating display information for the display such that, as a user modifies one of the visual information objects by adding information, the modified visual information object grows and automatically bumps and does not occlude other visual information objects that impinge upon an area of growth of the modified visual information object, wherein the bumped visual information objects may change positions in any direction of impingement, so as to prevent occlusion, wherein each user perceptible representation includes distance information indicating a distance of the corresponding visual information object from the viewed space, wherein the modification of one of the visual information objects by movement within the viewable space automatically rescales the moved visual information object, and bumps other visual information objects, to prevent occlusion yet maintain a spatial arrangement with respect to the other visual information objects, and wherein the contracts of each visual information object dictate general policies for the visual information object's display characteristics, growth behavior, movement capabilities, and scale factor.

2. The system of claim 1 wherein the user modification of the information contained within one visual information object includes editing the information contained within the visual information object.

3. The system of claim 1 wherein the user modification of the information contained within one visual information object includes adding additional information to the information contained within the visual information object.

4. The system of claim 1 wherein the position of one visual information object remains in the viewed space after the visual information object's position has been changed in the populated space.

5. The system of claim 1 wherein the visual information objects include one or more of:
a space object type for indicating a content based relationship amongst visual information objects;
a text object type for representing textual information having textual behaviors; or
a structure object type for representing sets of visual information objects having a predetermined structure.

6. The system as recited in claim 5 wherein said predetermined structure of said structure object type is a list structure.

7. The system as recited in claim 5 wherein said space object type is displayed as a view area of a larger populated area wherein information objects are positioned.

8. A method of operating a computer controlled free form sensemaking system comprising the computer implemented steps of:

a) a processor generating and displaying user perceptible representations of a visual information objects in a viewed space that is contained within a populated space wherein each visual information object contains information modifiable by a user and wherein each visual information object has one or more associated contracts for defining automatic behavior responsive to an interaction with other visual information objects, b) detecting a user input indicating a modification of the information contained in the visual information object such that the visual information object would grow and occlude a portion of another visual information object, and c) a processor generating display information for the display such that the modified visual information object grows and automatically bumps, instead of occluding, other visual information objects, changing the position of the other visual information objects, wherein the bumped visual information objects may change positions in any direction of impingement, so as to prevent occlusion, wherein the modification of one of the visual information objects by movement within the viewable space automatically rescales the moved visual information object, and bumps other visual information objects, to prevent occlusion yet maintain a spatial arrangement with respect to the other visual information objects, wherein the contracts dictate general policies for each visual information object's display characteristics, growth behavior, movement capabilities, and scale factor.

9. The method of claim 8 wherein the user input indicating a modification of the information contained in the user perceptible representation of one visual information object comprises editing the information.

10. The method of claim 8 wherein the user input indicating a modification of the information contained in the user perceptible representation comprises adding additional information.

11. The method of of claim 8 wherein the position of the user perceptible representation remains in the viewed space after its position has been changed in the populated space.

* * * * *